(12) United States Patent
Soulie et al.

(10) Patent No.: US 9,461,913 B2
(45) Date of Patent: Oct. 4, 2016

(54) METHOD OF DATA TRANSMISSION IN A SYSTEM ON CHIP

(71) Applicant: STMicroelectronics (Grenoble 2) SAS, Grenoble (FR)

(72) Inventors: Michael Soulie, Voiron (FR); Riccardo Locatelli, Fontanil (FR); Antonio-Marcello Coppola, Sassenage (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 515 days.

(21) Appl. No.: 13/894,093

(22) Filed: May 14, 2013

(65) Prior Publication Data

US 2013/0301643 A1    Nov. 14, 2013

(30) Foreign Application Priority Data

May 14, 2012    (FR) ...................... 12 54401

(51) Int. Cl.
*H04L 12/28*     (2006.01)
*H04L 12/721*    (2013.01)
*G06F 13/40*     (2006.01)

(52) U.S. Cl.
CPC ........... *H04L 45/72* (2013.01); *G06F 13/4018* (2013.01)

(58) Field of Classification Search
CPC ...................................... H04L 45/72
USPC ...................................... 370/392
See application file for complete search history.

(56) References Cited

U.S. PATENT DOCUMENTS

2006/0125664 A1\* 6/2006 Liardet ............... H04L 9/002
341/60

2009/0067343 A1\* 3/2009 Fritz .................. G06F 17/505
370/254
2011/0219208 A1\* 9/2011 Asaad ................. G06F 15/76
712/12
2013/0051397 A1\* 2/2013 Guo ..................... H04L 45/00
370/400

FOREIGN PATENT DOCUMENTS

EP    2 061 191 A1    5/2009

OTHER PUBLICATIONS

French Search Report, dated Feb. 4, 2013 for French application No. 1254401, 7 pages.

(Continued)

*Primary Examiner* — Dang Ton
*Assistant Examiner* — Abdeltif Ajid
(74) *Attorney, Agent, or Firm* — Seed IP Law Group PLLC

(57) ABSTRACT

Embodiments relate to a method for transmitting a message in a data path of a network, the method includes transmitting a message onto an input bus of an input interface module, the message being received in flits of a size corresponding to the width of the input bus and generating a validity indicator for each elementary flit constituting each flit received. The message is transmitted onto an output bus of the input interface module towards a receiving interface module in flits of a size corresponding to the width of the output bus along with each validity indicator generated in association with the corresponding elementary flit. The receiving interface module receives flits constituting the message and the associated validity indicators and rejects a received flit if an elementary flit of the received flit is associated with a validity indicator in the invalid state.

20 Claims, 15 Drawing Sheets

(56) References Cited

OTHER PUBLICATIONS

Liu et al., "Memory Built-in Self Test in Multicore Chips with Mesh-Based Networks," IEEE Micro, IEEE Service Center, Los Alamitos, CA, vol. 29(5), Sep. 1, 2009, 10 pages.

Saponara et al., "Design and coverage-driven verification of a novel network-interface IP macrocell for network-on-chip interconnects," Microprocessors and Microsystems, vol. 35(6), Jul. 8, 2011, pp. 579-592.

Seiculescu et al., "A DRAM Centric NoC Architecture and Topology Design Approach," VLSI (ISVLSI), 2011 IEEE Computer Society Annual Symposium on, IEEE, Jul. 4, 2011, pp. 54-59.

\* cited by examiner

METHOD OF DATA TRANSMISSION IN A SYSTEM ON CHIP

BACKGROUND

1. Technical Field

The present disclosure relates to data transmission in a network comprising buses of different widths and particularly to systems on chip (SoCs) and networks on chip (NoCs).

2. Description of the Related Art

Systems on chip result from the integration into a same chip of several modules, which can comprise several processors, selected from a library of modules. The modules of a system on chip are not necessarily compatible between themselves particularly in terms of clock signal, communication protocol and interface bus width.

Generally, bridges that provide a communication protocol and/or bus width and/or clock frequency conversion are implemented to interconnect two interface buses that are not compatible between themselves. However, when the number of modules to be interconnected having incompatible interfaces is high, the number of bridges becomes excessive. Providing a high number of bridges indeed induces significant costs in terms of silicon surface, latency and energy consumption.

To facilitate the design of systems on chip and in particular the interconnection of the modules of such systems, networks have been developed. These networks, referred to as "networks on chip", generally implement distributed communication means and are based on communication by packet switching and wormhole. Some of these networks comprise three types of communication components, i.e., network interfaces that provide the connection of a module with the network, routers that provide the transmission of packets between the network interfaces and other routers, and links between the routers and between the network interfaces and the routers. Each network interface particularly performs a protocol, and/or clock frequency, and/or data bus width conversion, between an interface bus of a module to which it is connected and a bus internal to the network. Furthermore, some modules have their own network, which is then linked to the network on chip. In addition, for the sake of improved optimization particularly of the chip surface area occupied by the system, it can be useful to provide different data bus widths according to the transmission rates of the modules to be interconnected. The result is that a data bus width is also capable of being converted in certain links between routers. As a result, several data bus width conversions may be applied to a message during the routing thereof between a transmitting module and a receiving module.

Two types of problem may arise during such a data bus width conversion. When converting a bus of a given width towards a bus with a smaller width, additional invalid data can be generated and transmitted into the network. It is true that a message transmitted by a data bus does not necessarily have a size corresponding to a whole number of times the width of the bus. The result is that one or more of the last words of the message transmitted by the data bus contain non-valid data. If this message is converted to be transmitted by a less wide data bus, the non-valid data transmitted may be alone in a word transmitted by the less wide data bus. This results in pointless consumption of bandwidth.

When converting towards a wider data bus, valid data can be placed on wrong data lines of the wider data bus. Such a conversion can therefore lead to errors in the reconstruction of messages transmitted by the network.

It is thus desirable to provide data bus width conversions so as to avoid these problems. It is also desirable to provide such conversions by implementing simple mechanisms and occupying as little surface as possible on the chip.

BRIEF SUMMARY

Some embodiments relate to a method of transmitting a message in a data path of a network, comprising buses of different widths, the method comprising steps of: transmitting a message onto an input bus of an input interface module of the network, the message being received by the interface module, divided into flits corresponding to the width of the input bus, and transmitting the message received onto an output bus of the interface module towards a receiving interface module, the message transmitted onto the output bus being divided into flits having a size corresponding to the width of the output bus of the input interface module. According to one embodiment, the method comprises steps of: generating a validity indicator for each elementary flit constituting each flit received by the input interface module, each elementary flit having a size corresponding to or smaller than the smallest bus width of the network, each validity indicator indicating whether or not the corresponding elementary flit is valid, transmitting to the receiving interface module, each validity indicator generated, in association with the corresponding elementary flit, and the receiving interface module receiving flits constituting the message and the associated validity indicators, and rejecting a flit received if each elementary flit of the flit is associated with a validity indicator in the invalid state.

According to one embodiment, the method comprises the application of a circular permutation to the elementary flits FLT1 of a flit of a message received by the receiving interface module, according to a target address of the message received, when the size of the message received is less than half the width of an output bus of the receiving interface module.

According to one embodiment, the validity indicators are generated by the input interface module according to the size of the message, to the width of the input bus via which the message is received and to a target address of the message.

According to one embodiment, the method comprises, in the input interface module, and/or in the receiving interface module, steps of storing the flits received in a first buffer memory, and of storing the validity indicators generated or received in a second buffer memory.

According to one embodiment, the message has a size less than or equal to that of an elementary flit, and is received in a flit comprising several elementary flits, the target address of the message being used to determine the position of the elementary flit containing the message in the received flit, the validity indicators of the elementary flits of the received flit being determined according to this position.

According to one embodiment, the message has a size less than or equal to half a received flit comprising several elementary flits, the target address of the message being used to determine the position of each elementary flit containing a portion of the message in the received flit, the validity indicators of the elementary flits of the received flit being determined according to this position.

According to one embodiment, the method comprises steps of: receiving by a link module of the network situated in the data path, flits constituting the message, and validity indicators associated with the flits received, dividing the message received into flits corresponding to the width of an output bus of the link module, and transmitting to the receiving interface module each flit obtained in the division step, if each elementary flit contained in the flit is associated with a validity indicator in the invalid state, each flit transmitted by the link module being transmitted in association with the validity indicator of each elementary flit contained in the flit.

According to one embodiment, the method comprises, in the link module, steps of storing the flits received in a first buffer memory, and of storing the validity indicators received in a second buffer memory.

Some embodiments also relate to a system comprising master modules and slave modules, each master and slave module being linked to a network through an interface module, the interface modules being configured to implement the method as defined above.

According to one embodiment, the system comprises link modules located in the network on data paths and configured to: receive flits constituting a message, and the validity indicators associated with the flits received, divide the message received into flits corresponding to the width of an output bus of the link module, and transmit onto the output bus each flit obtained in the division step, if each elementary flit contained in the flit is associated with a validity indicator in the invalid state, each flit transmitted being transmitted by the link module in association with the validity indicator of each elementary flit contained in the flit.

According to one embodiment, each link module comprises a first buffer memory for storing the flits received, and a second buffer memory for storing validity indicators received.

According to one embodiment, each bus of the network is associated with a transmission line for transmitting validity indicators per elementary flit contained in each flit likely to be transmitted by the bus.

According to one embodiment, the network comprises routing modules to route messages to a receiving module, according to a target address of the message.

Some embodiments also relate to a system on chip, comprising a system as defined above.

According to one embodiment, the system on chip comprises at least two of the bus types belonging to a set comprising STBus, AMBA, AXI, AHB, APB, CoreConnect, and Wishbone.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. One or more embodiments are described hereinafter with reference to the accompanying drawings in which.

DETAILED DESCRIPTION

Figure 1:
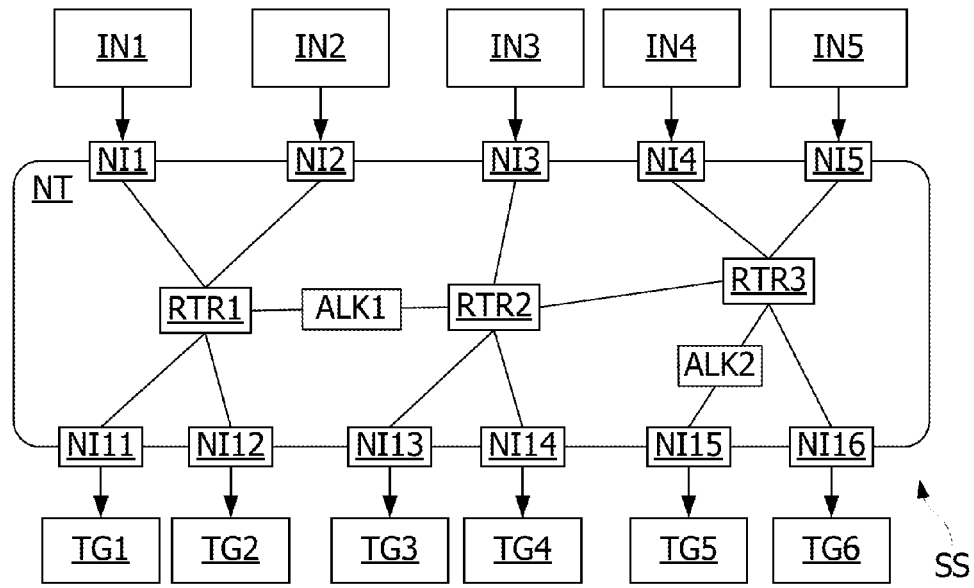
FIG. 1 schematically represents a system on chip comprising a network on chip, only a portion of the network providing the transmission of requests being represented, FIG. 2 schematically represents components implemented in a data transmission path between two modules of the system on chip according to one embodiment, FIG. 3 schematically represents a network interface module according to one embodiment, FIGS. 4A to 4I schematically represent different embodiments of a sending portion of a network interface module according to the bus widths upstream and downstream of the network interface module, FIGS. 5A to 5I schematically represent different embodiments of a conversion module of a link module of the network according to the bus widths upstream and downstream of the link module, FIGS. 6A to 6I schematically represent different embodiments of a receiving portion of a network interface module according to the bus widths upstream and downstream of the network interface module.

FIG. 1 represents a system on chip SS comprising master modules IN1 to IN5 and slave modules TG1 to TG6 interconnected by a network on chip NT. The master modules IN1-IN5 send requests to the slave modules TG1-TG6, and each slave module sends a response to a request received, to the master module sending this request. The requests and responses are transmitted by the network NT. For more clarity, only a portion of the bus NT providing the transmission of the requests is shown, the network NT comprising a portion (not shown) providing the transmission of the responses. The portion of the network providing the transmission of the responses can be symmetrical to the one providing the transmission of the requests or different.

The network NT provides the data transmission based on packet switching for example. The network NT comprises interface modules NI1 to NI5 and NI11 to NI16, routers RTR1 to RTR3 and link modules ALK1, ALK2 between the interface modules and the routers and between the routers. Each module IN1-IN5, TG1-TG6 is linked to the network NT through an interface module NI1-NI5 and NI11-NI16.

Below, "data bus" or "bus" indifferently designates by convention a data transmission link outside the network, connected to an interface module NI1-NI5 and NI11-NI16, or a data transmission link inside the network.

Upon sending to the network NT, each interface module NI1-NI5, NI11-NI16 performs a communication protocol conversion between the protocol used by the module IN1-IN5, TG1-TG6 to which it is connected and the network, and possibly a clock frequency and/or bus width conversion, as well as an encapsulation of the data to be transmitted. Upon receiving from the network NT, each interface module NI1-NI5, NI11-NI16 performs a communication protocol conversion between the protocol used by the module IN1-IN5, TG1-TG6 to which it is connected and the network, an extraction of the data received, and possibly a clock frequency and/or bus width conversion. The network NT comprises routers RTR1, RTR2, RTR3 to route the data sent by the interface modules NI1-NI5, NI11-NI16 to the receiving interface modules, and link modules ALK1, ALK2 to particularly perform bus width conversions. The routers RTR1-RTR3 each comprise several input/output ports, and select a port to route a message received, according to message destination information found in the message heading.

In the example in FIG. 1, the router RTR1 is connected to the interface modules NI1, NI2, NI11 and NI12, and is linked to the router RTR2 through the link module ALK1. The router RTR2 is connected to the interface modules NI3, NI13 and NI14, and to the router RTR3. The router RTR3 is connected to the interface modules NI4, NI5 and NI16 and is linked to the interface module NI15 through the link module ALK2.

The data are transmitted in the network NT encapsulated in messages comprising a heading and possibly end-of-message data. The messages are themselves divided into flow control units referred to as "flits", comprising a number of bits corresponding to the width of the bus. The messages are transmitted in the network NT in accordance with the wormhole routing mode whereby a data transmission path is kept open between a transmitting module and a receiving module until all the flits making up a message have been transmitted, the first flit of the message containing message routing data enabling each router RTR1-RTR3 to determine to which module (interface module or router) of the network NT the message must be transmitted.

The network NT can implement the "Spidergon" topology developed by the Applicant, or a derived architecture. The connection buses for connecting the interface modules NI1-NI5, NI11-NI16 to the master and slave modules IN1-IN5, TG1-TG6 can implement protocols such as the STBus protocol developed by the Applicant, the AMBA-type protocols such as ACE, AXI, AHB, APB developed by the company ARM, or the CoreConnect protocol developed by the company IBM, or even the Wishbone protocol developed in "open source".

Figure 2:
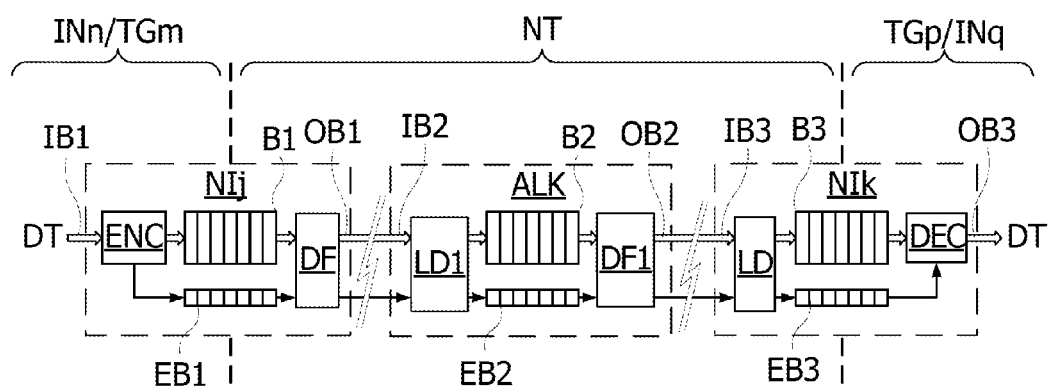

FIG. 2 represents a data transmission path for transmitting data between a master module INn sending a request or a slave module TGm sending a response to a request, and a slave module TGp receiving the request or a master module INq receiving the response to the request. The data transmission path comprises a transmitting interface module NIj, a link module ALK, and a receiving interface module NIk. The modules NIj and NIk can be any interface module NI1-NI5, NI11-NI16. The module ALK can be located in one of the link modules ALK1, ALK2.

The data transmission path comprises in the module NIj an encoding module ENC, a data buffer memory B1, for example of FIFO-type (First In, First out), and a decoding module DF. The module ENC is configured to break down into flits a message to be transmitted DT, by taking into account the respective widths of the input IB1 and output OB1 buses of the module NIj, and the communication protocols respectively implemented upstream by the module INn/TGm and downstream of the module NIj. The size of the flits generated by the module ENC corresponds to the width of the output bus OB1 of the module INj. The flits generated comprise one or more elementary flits the size of which corresponds to the width of the least wide bus of the system SS. For example, the system SS comprises buses of 32, 64 and 128 bits. The elementary flits thus comprise 32 bits, and the flits generated by the module ENC comprise one, two or four elementary flits. The memory B1 is provided for storing several of the flits generated by the module ENC. The module DF is configured to read the flits in the memory B1 and to send them onto the output bus OB1 of the module NIj.

According to one embodiment, the module NIj comprises a validity bit buffer memory EB1, for example of FIFO-type. The memory EB1 is organized and designed for storing one validity bit per elementary flit constituting the flits stored in the memory B1. Each of the bits stored in the memory EB1 indicates whether or not the corresponding elementary flit in the memory B1 is valid. The module DF is configured to transfer a flit onto the output bus OB1 of the module NIj only if the flit comprises at least one valid elementary flit as indicated by the validity bits in the memory EB1 corresponding to the elementary flits constituting the flit. The module DF is also configured to send the validity bits read in the memory EB1 onto an output of the module NIj.

The data transmission path comprises in the module ALK a buffer memory B2, a loading module LD1 to load the memory B2 with flits received via an input bus IB2, and a reading module DF1 to read the flits in the memory B2. The memory B2, which can also be of FIFO-type, receives from the module LD1 the flits of a message transmitted by the network NT and received via the input bus IB2 of the module ALK. The module DF1 is configured to transmit the flits read in the memory B2 into the network via an output bus OB2 of the module ALK.

According to one embodiment, the module ALK comprises a buffer memory EB2, for example of FIFO-type, to store validity bits of elementary flits stored in the memory B2, transmitted by the network NT. The module LD1 comprises an input for receiving the validity bits corresponding to the elementary flits received. The module LD1 is configured to load the validity bits received into the memory EB2. Each of the bits stored in the memory EB2 indicates whether or not the corresponding elementary flit in the memory B2 contains a valid datum. The module DF1 is configured to read the memories B2 and EB2 and to transmit into the network NT only the flits read in the memory B2, which contain at least one valid elementary flit, as indicated by the corresponding validity bit in the memory EB2. The module DF1 is also configured to transmit into the network the read validity bits corresponding to the elementary flits transmitted.

The data transmission path comprises in the module NIk a buffer memory B3, a loading module LD for loading the memory B3 and a decoding module DEC. The memory B3, which can also be of FIFO-type, is loaded with the flits of a message received from the network by the module LD via an input bus IB3 of the module NIk. The module DEC is configured to transmit the flits read in the memory B3 onto an output bus OB3 of the module NIk towards the module TGp, INq receiving the message. The module DEC performs, as applicable, a communication protocol, and/or clock frequency, and/or data bus width conversion.

According to one embodiment, the module NIk comprises a buffer memory EB3 to store validity bits of the elementary flits stored in the memory B3. The module LD comprises an input for receiving the validity bits corresponding to the elementary flits received and is configured to load the validity bits received into the memory EB3. The module DEC is configured to transmit towards the receiving module TGp, INq only the flits read in the memory B3, which contain at least one valid elementary flit, i.e., corresponding to a validity bit in the memory EB3 in the valid state. The module DEC can also be configured to perform the loading of each valid elementary flit onto a correct portion of the output bus OB3.

It shall be noted that the module ALK may not be necessary and may thus be omitted in the transmission path represented in FIG. 2.

Figure 3:
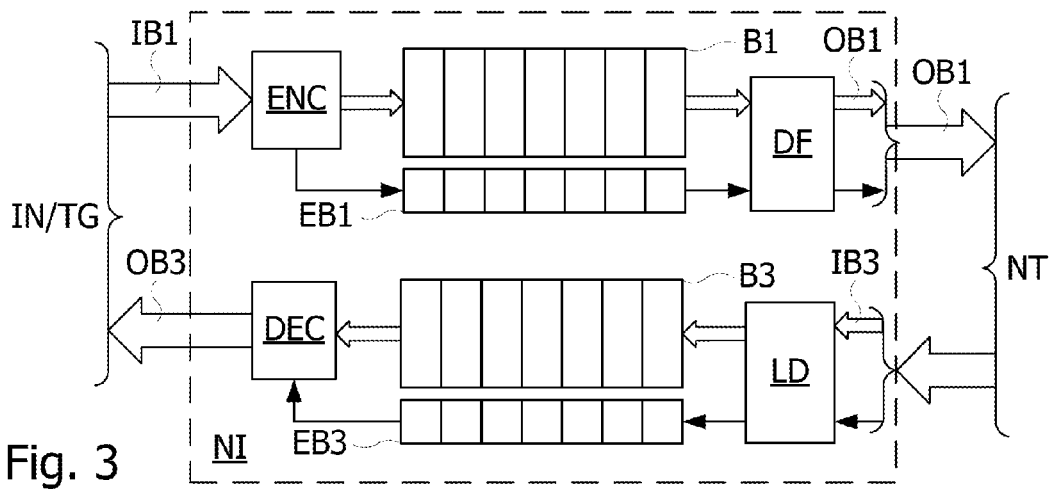

FIG. 3 represents an interface module NI such as the module NIj or NIk. The module NI comprises a data send circuit comprising the elements of the module NIj represented in FIG. 2 and a data receive circuit comprising the elements of the module NIk in FIG. 2.

FIGS. 4A to 4I, 5A to 5I and 6A to 6I particularly represent bus width conversion circuits.

Figure 4A:
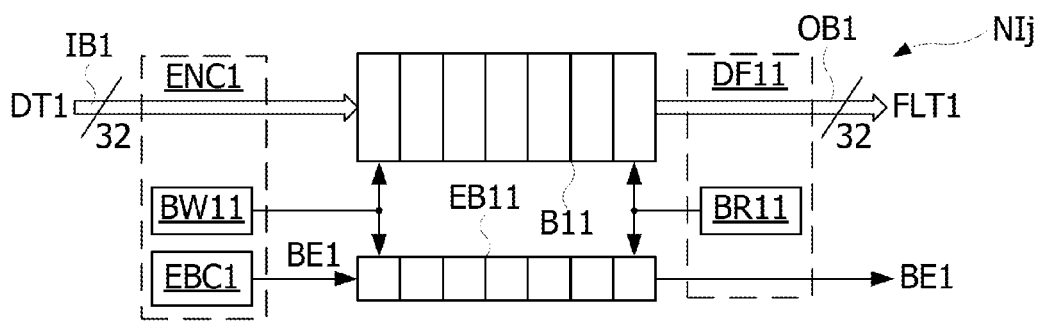

FIGS. 4A to 4I represent in greater detail different embodiments of data send circuits of the interface module NIj, depending on the width of each of the input IB1 and output OB1 buses of the module NIj. FIG. 4A shows the case in which the data input IB1 and output OB1 buses of the module NIj have a width corresponding to the size of an elementary flit, for example 32 bits. The module NIj comprises an encoding module ENC1, buffer memories for data B11 and validity bits EB11 and a reading module DF11. The module ENC1 comprises an addressing module BW11 for simultaneously (i.e., concurrently) addressing the buffer memories B11 and EB11, and a validity bit generating module EBC1, which writes in the memory EB11 at a position selected by the module BW11. The memory B11 is designed for storing a few elementary flits and can be addressed by word having the size of an elementary flit. The memory EB11 is provided for storing validity bits supplied by the module EBC1, and which can for example be addressed individually. The memory EB11 is designed for storing one validity bit per elementary flit likely to be stored in the memory B11. The module BW11 is configured to successively select each free 32-bit location in the memory B11 and each free 1-bit location in the memory EB11. The module ENC1 loads each 32-bit flit FLT1 of a message DT1 to be sent, into the memory B11 at a position selected by the module BW11. When a flit FLT1 is loaded into the memory B11, the module EBC1 generates a validity bit BE1 in the valid state (for example on 1) that is loaded into the memory EB11 at a corresponding position selected by the module BW11. The module DF11 comprises an addressing module BR11, which simultaneously addresses the memories B11 and EB11 to successively transfer each flit FLT1 in the memory B11 to the output of the module NIj, if the flit is associated in the memory EB11 with a validity bit BE1 in the valid state. Each bit BE1 read in the memory EB11 and corresponding to a valid flit is also supplied at the output of the module DF11.

Figure 4B:
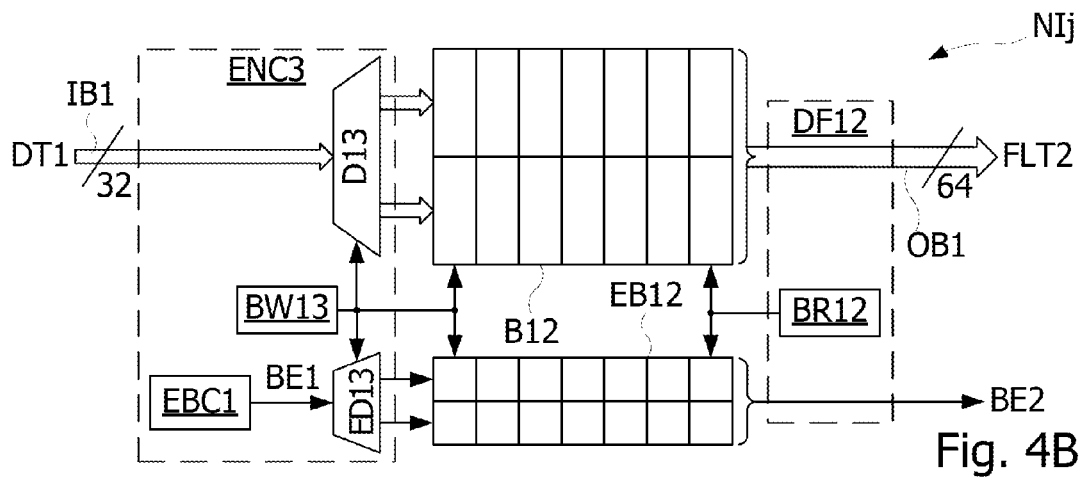

FIG. 4B shows the case in which the input bus IB1 of the module NIj has a width corresponding to the size of an elementary flit, for example 32 bits, and the output bus OB1 has a width corresponding to the size of two elementary flits, i.e., for example 64 bits. The module NIj comprises an encoding module ENC3, buffer memories for data B12 and for validity bits EB12 and a reading module DF12. The encoding module ENC3 comprises an addressing module BW13 for simultaneously addressing the memories B12 and EB12, and the validity bit generating module EBC1 (FIG. 4A), which writes in the memory EB12. The encoding module ENC3 also comprises demultiplexers D13, ED13 controlled by the module BW13. The demultiplexer D13 is controlled by the module BW13 to be able to load a 32-bit flit FLT1 of a message DT1 to be transmitted into each 32-bit location in the memory B12. The demultiplexer ED13 is controlled by the module BW13 to be able to load a 1-bit validity bit BE1 supplied by the module EBC1 into each 1-bit location in the memory EB12. The buffer memory B12 is designed for storing a few flits FLT2 and may be addressed for example by 64-bit word by the module BW13. The buffer memory EB12 is provided for storing a few validity bits, which may for example be addressed in pairs by the module BW13. The memory EB12 is designed for storing one validity bit per elementary flit likely to be stored in the memory B12. The module BW13 is configured to successively select, using the multiplexers D13 and ED13, each free 32-bit location in the memory B12 and each free 1-bit location in the memory EB12. The module ENC3 loads each 32-bit flit FLT1 of the message DT1 to be sent, into the memory B12 at a position selected by the module BW13 and a 32-bit location selected by the demultiplexer D13. When a flit is loaded into the memory B12, the module EBC1 generates a validity bit BE1 in the valid state that is loaded into the memory EB12 at a corresponding position, selected by the module BW13, and a 1-bit location selected by the demultiplexer ED13. The 1-bit locations not selected in the memory EB12 are put to the invalid state (for example on 0). The module DF12 comprises an addressing module BR12, which simultaneously addresses each 64-bit location in the memory B12 and each corresponding bit-pair location BE2 in the memory EB12 to transfer a 64-bit flit FLT2 to the output of the module NIj, if this flit is associated with a pair of validity bits BE2, which are not simultaneously in the invalid state. Each pair of bits BE2 corresponding to a flit transferred to the output of the module NIj, is also supplied at the output of the module DF12.

Figure 4C:
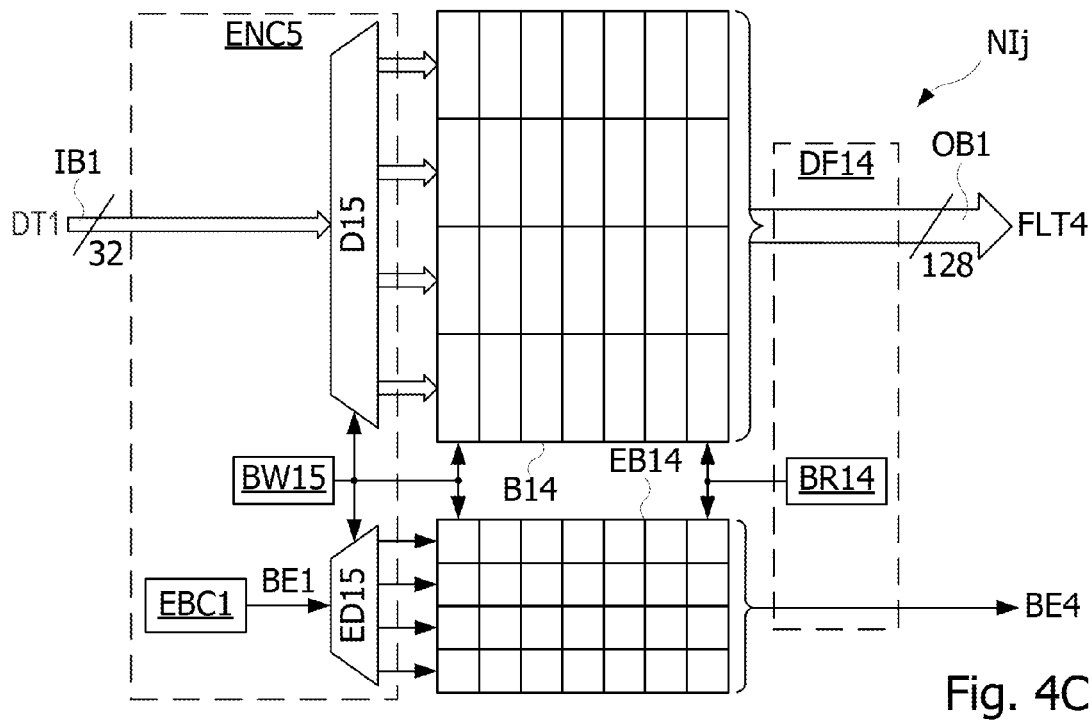

FIG. 4C shows the case in which the input bus IB1 of the module NIj has a width corresponding to the size of an elementary flit, for example 32 bits, and in which the output bus OB1 has a width corresponding to the size of four elementary flits, i.e., for example 128 bits. The module NIj comprises an encoding module ENC5, buffer memories for data B14 and for validity bits EB14 and a reading module DF14. The module ENC5 comprises an addressing module BW15 and the validity bit generating module EBC1 (FIG. 4A). The module BW15 addresses the memories B14 and EB14, and the validity bit generating module EBC1, which writes in the memory EB14. The module ENC5 also comprises demultiplexers D15, ED15 controlled by the module BW15. The demultiplexer D15 is used to store a 32-bit flit FLT1 of a message DT1 to be transmitted in each 32-bit location of the memory B14. The demultiplexer ED15 is used to store a 1-bit validity bit BE1 supplied by the module EBC1 in each 1-bit location of the memory EB14. The buffer memory B14 is designed for storing a few 128-bit words and can be addressed for example by 128-bit word by the module BW15. The buffer memory EB14 is provided for storing a few validity bits, which can for example be addressed by groups of 4 bits by the module BW15. The memory EB14 is designed for storing one validity bit per elementary flit likely to be stored in the memory B14. The module BW15 is configured to successively select, using the demultiplexers D15 and ED15, each free 32-bit location in the memory B14 and each free 1-bit location in the memory EB14. The module ENC5 loads each 32-bit flit FLT1 of the message DT1 to be sent in the memory B14 at a location selected by the module BW15. When a flit is loaded into the memory B14, the module EBC1 generates a validity bit BE1 in the valid state that is loaded into the memory EB14 at a corresponding position, selected by the module BW15. The 1-bit locations not selected in the memory EB14 are put to the invalid state. The module DF14 comprises an addressing module BR14, which successively addresses each 128-bit location in the memory B14 and each 4-bit location BE4 in the memory EB14 corresponding to the location addressed in the memory B14, to transfer a 128-bit flit FLT4 to the output of the module NIj, if this flit is associated with a group of four validity bits BE4, which are not simultaneously in the invalid state. Each group of four bits BE4 corresponding to a flit transferred to the output of the module NIj, is also supplied at the output of the module DF14.

Figure 4D:
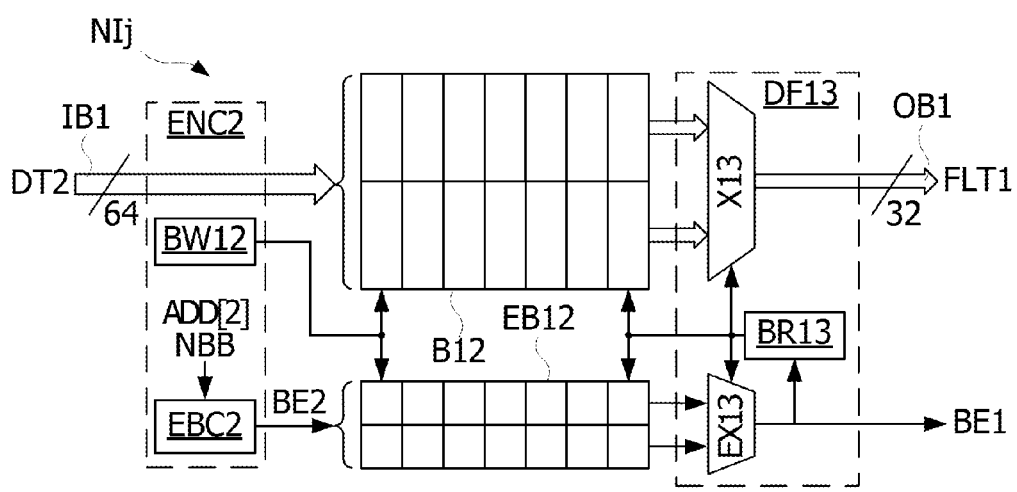

FIG. 4D shows the case in which the input bus IB1 of the module NIj has a width corresponding to the size of two elementary flits, i.e., for example 64 bits, and in which the output bus OB1 has a width corresponding to the size of an elementary flit, i.e., for example 32 bits. The module NIj comprises an encoding module ENC2, the buffer memories for data B12 and validity bits EB12 (FIG. 4B) and a reading module DF13. The encoding module ENC2 comprises an addressing module BW12 for addressing the memories B12 and EB12, and a module for generating pairs of validity bits EBC2, which writes in the memory EB12. The module BW12 is configured to successively select each free 64-bit location in the memory B12 and each corresponding 2-bit location in the memory EB12. The module ENC2 loads each 64-bit flit FLT2 of a message DT2 to be sent, into the memory B12 at a position selected by the module BW12. When a flit is loaded into the memory B12, the module EBC2 generates a pair of validity bits BE2, comprising at least one bit in the valid state. Each pair of validity bits generated BE2 is loaded into the memory EB12 at a corresponding position selected by the module BW12. The module DF13 comprises an addressing module BR13 and multiplexers X13, EX13 controlled by the module BR13. The module BR13 successively addresses each 64-bit location of the memory B12 and each pair of validity bits stored in the memory EB12, and controls the multiplexers X13, EX13 to transfer to the output of the module NIj, a 32-bit flit FLT1 selected in the 64-bit flit FLT2 addressed by the module BR13, if this flit is associated with a validity bit BE1 selected by the multiplexer EX13, in the valid state. On the contrary, if the validity bit of the flit FLT1 addressed in the memory B12 and selected by the multiplexer X13 is zero, i.e., if the flit is invalid, the flit is not transmitted and is removed from the memory B12. Each bit BE1 corresponding to a flit transferred to the output of the module NIj, is also supplied at the output of the module DF13.

Figure 4E:
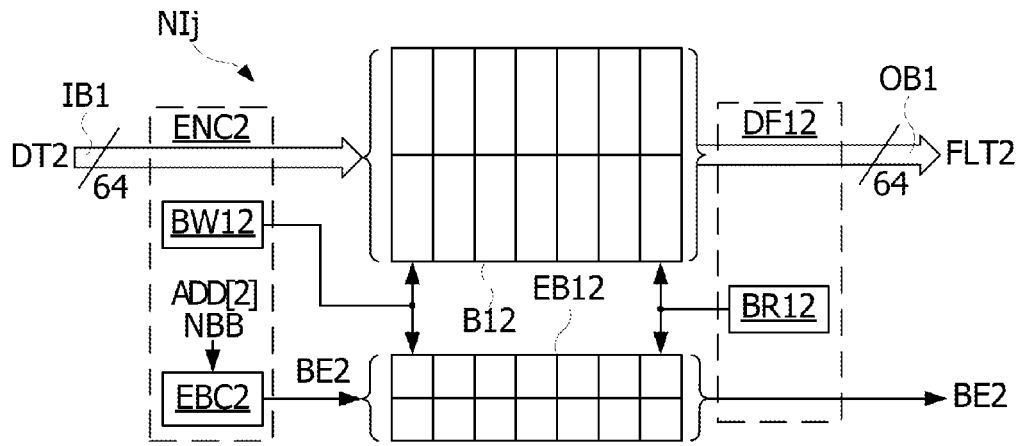

FIG. 4E shows the case in which the input IB1 and output OB1 buses of the module NIj have a width corresponding to the size of two elementary flits, i.e., for example 64 bits. The module NIj comprises the encoding module ENC2 (FIG. 4D), the buffer memories for data B12 and for validity bits EB12 (FIG. 4B), and the reading module DF12 (FIG. 4B).

Figure 4F:
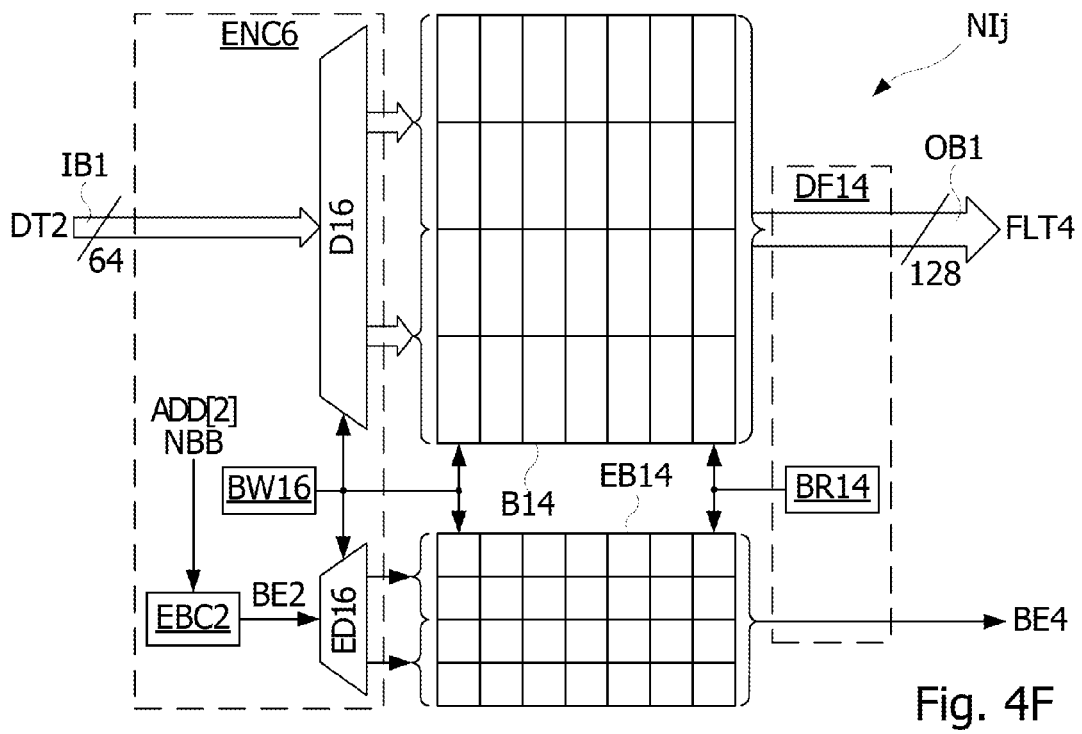

FIG. 4F shows the case in which the input bus IB1 of the module NIj has a width corresponding to the size of two elementary flits, i.e., for example 64 bits, and in which the output bus OB1 has a width corresponding to the size of four elementary flits, i.e., for example 128 bits. The module NIj comprises an encoding module ENC6, the buffer memories for data B14 and for validity bits EB14 (FIG. 4C) and the reading module DF14 (FIG. 4C). The encoding module ENC6 comprises an addressing module BW16 for addressing the memories B14 and EB14, and the validity bit generating module EBC2 (FIG. 4D), which writes in the validity bit buffer memory EB14. The module ENC6 also comprises demultiplexers D16, ED16 controlled by the module BW16. The demultiplexer D16 is controlled by the module BW16 to be able to load a 64-bit flit FLT2 of a message DT2 to be transmitted into each 64-bit location of the memory B14. The demultiplexer ED16 is controlled by the module BW16 to be able to load two validity bits BE2 supplied by the module EBC2 into each 2-bit location of the memory EB14. The module BW16 is configured to successively select, using the demultiplexers D16 and ED16, each free 64-bit location in the memory B14 and each free 2-bit location in the memory EB14. The module ENC6 loads each 64-bit flit FLT2 of the message DT2 to be sent into the memory B14 at a position selected by the module BW16 and by the demultiplexer D16 controlled by the module BW16. When a 64-bit flit FLT2 is loaded into the memory B14, the module EBC2 generates a pair of validity bits BE2 in the valid state. The pair of validity bits generated is loaded into the memory EB14 at a corresponding position, selected by the module BW16. The 2-bit locations not selected in the memory EB14 are put to the invalid state.

Figure 4G:
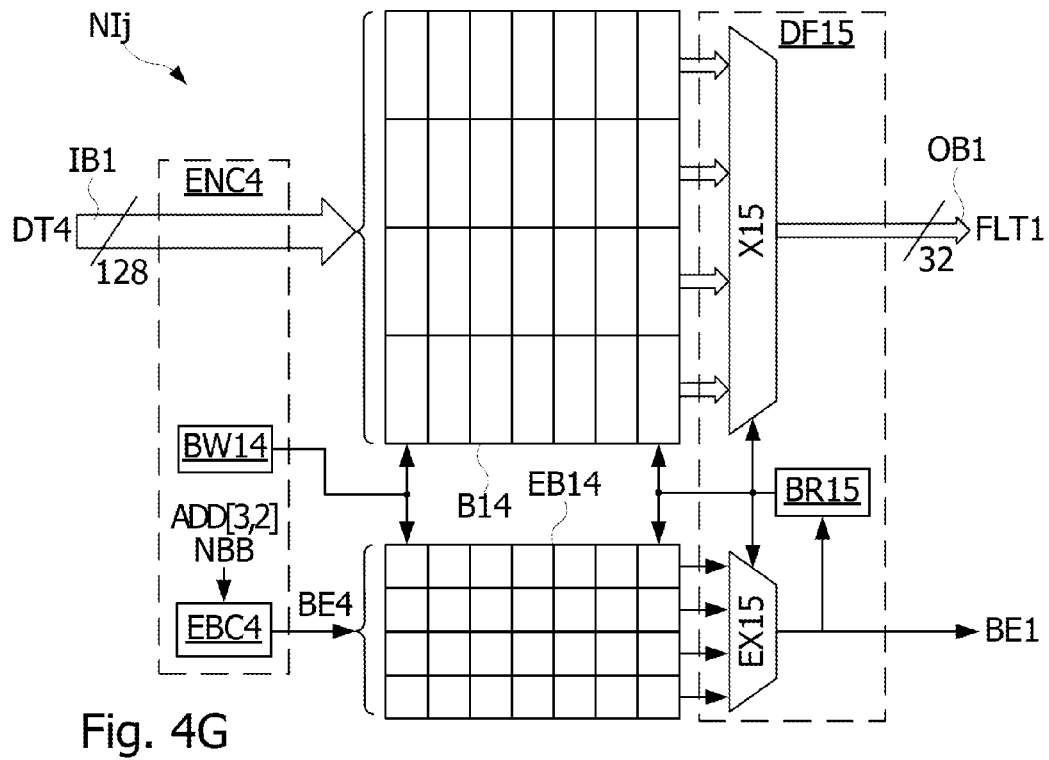

FIG. 4G shows the case in which the input bus IB1 of the module NIj has a width corresponding to the size of four elementary flits, i.e., for example 128 bits, and in which the output bus OB1 has a width corresponding to the size of an elementary flit, i.e., for example 32 bits. The module NIj comprises an encoding module ENC4, the buffer memories for data B14 and for validity bits EB14 (FIG. 4C) and a reading module DF15. The encoding module ENC4 comprises an addressing module BW14 for addressing the memories B14 and EB14, and a validity bit generating module EBC4, which writes in the memory EB14. The module BW14 is configured to successively select each free 128-bit location in the memory B14 and each corresponding 4-bit location in the memory EB14. The module ENC4 loads each 128-bit flit FLT4 of a message DT4 to be sent into the memory B14 at a position selected by the module BW14. When a 128-bit flit FLT4 is loaded into the memory B14, the module EBC4 generates a group of four validity bits BE4 comprising at least one bit in the valid state. The group of validity bits generated is loaded into the memory EB14 at a position selected by the module BW14. The module DF15 comprises an addressing module BR15 and multiplexers X15, EX15 controlled by the module BR15. The addressing module BR15 successively addresses each 128-bit location in the memory B14 and each 4-bit location BE4 in the memory EB14, and controls the multiplexers X15, EX15 to transfer a 32-bit flit FLT1 selected in the 128-bit flit FLT4 addressed by the module BR15, to the output of the module NIj, if this flit corresponds to a validity bit BE1 selected by the multiplexer EX15 in the valid state. On the contrary, if the flit FLT1 addressed in the memory B14 and selected by the multiplexer X15 is invalid, the flit is not transmitted and is removed from the memory B14. Each bit BE1 corresponding to a flit transferred to the output of the module NIj, is also transferred to the output of the module NIj.

Figure 4H:
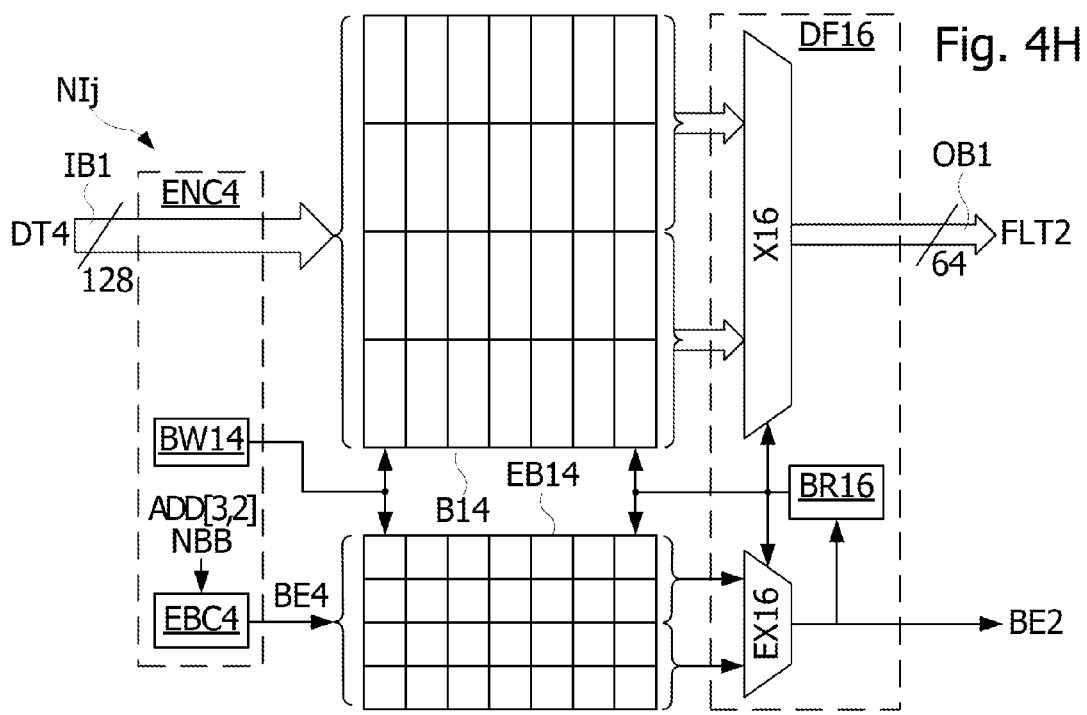

FIG. 4H shows the case in which the input bus IB1 of the module NIj has a width corresponding to the size of four elementary flits, i.e., for example 128 bits, and in which the output bus OB1 has a width corresponding to the size of two elementary flits, i.e., for example 64 bits. The module NIj comprises the encoding module ENC4 (FIG. 4G), the buffer memories for data B14 and for validity bits EB14 (FIG. 4C), and a reading module DF16. The module DF16 comprises an addressing module BR16 and multiplexers X16, EX16 controlled by the module BR16. The addressing module BR16 successively addresses each 128-bit location in the memory B14 and each corresponding 4-bit location BE4 in the memory EB14, and controls the multiplexers X16, EX16 to transfer a 64-bit flit FLT2 selected in the 128-bit flit FLT4 addressed by the module BR16, to the output of the module NIj, if this flit is associated with a pair of validity bits BE2 selected in the memory EB14 by the multiplexer EX16, at least one bit of which is in the valid state. On the contrary, if the flit FLT2 addressed in the memory B14 and selected by the multiplexer X16 is invalid, it is not transmitted and is removed from the memory B14. Each pair of bits BE2 corresponding to a flit transferred to the output of the module NIj, is also transferred to the output of the module NIj.

Figure 4I:
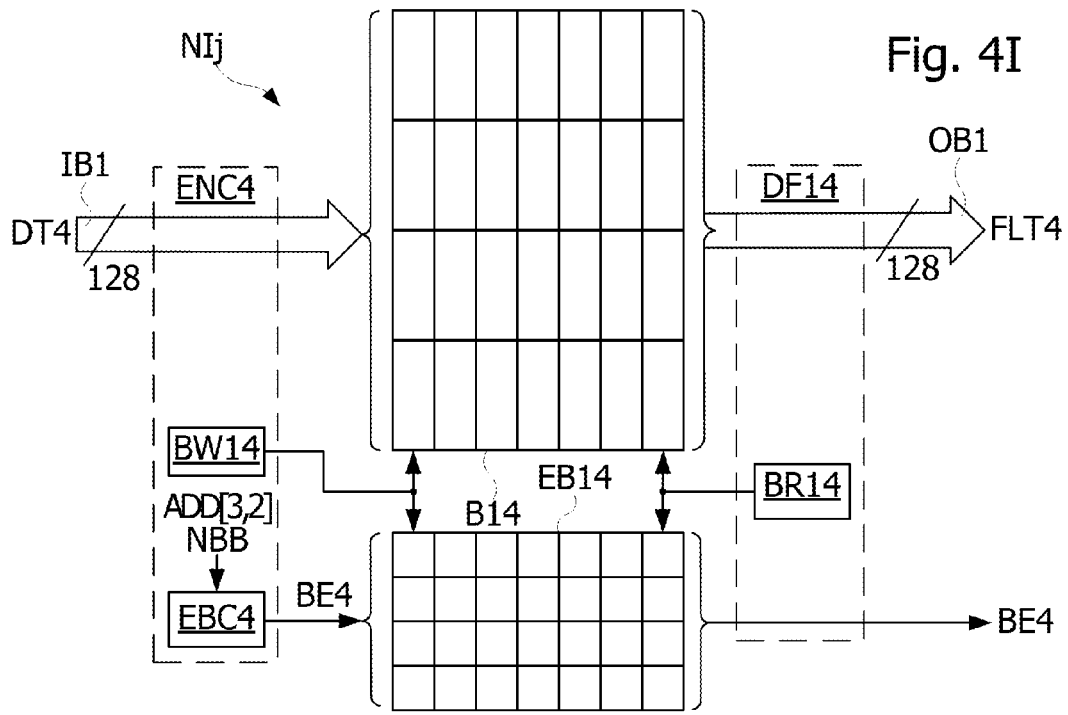

FIG. 4I shows the case in which the input IB1 and output OB1 buses of the module NIj have a width corresponding to the size of four elementary flits, i.e., for example 128 bits. The module NIj comprises the encoding module ENC4 (FIG. 4G), the buffer memories for data B14 and for validity bits EB14 (FIG. 4C), and the reading module DF14 (FIG. 4C).

The interface modules NIj in FIGS. 4A, 4E and 4I do not perform any bus width conversion towards a different link width (local size conversion), but can perform a communication protocol and/or clock frequency conversion.

Figure 5A:
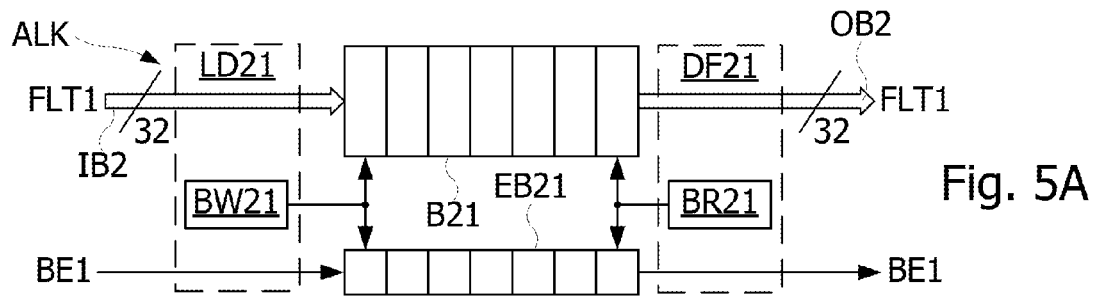

FIGS. 5A to 5I represent in greater detail different embodiments of data transmission circuits of the link module ALK, depending on the width of the input IB2 and output OB2 buses of the module ALK. FIG. 5A shows the case in which the input IB2 and output OB2 buses of the module ALK have a width corresponding to the size of an elementary flit, i.e., for example 32 bits. The module ALK comprises a loading module LD21, buffer memories for data B21 and for validity bits EB21 and a reading module DF21. The module LD21 comprises an addressing module BW21 for addressing the buffer memories B21 and EB21. The buffer memory B21 is designed for storing a few 32-bit words and can be addressed by 32-bit word. The buffer memory EB21 is provided for storing a few validity bits BE1 received by the module LD21, which can for example be addressed individually. The memory EB21 is designed for storing one validity bit per elementary flit likely to be stored in the memory B21. The module BW21 is configured to successively select each free 32-bit location in the memory B21 and each corresponding 1-bit location in the memory EB21. The module LD21 loads each 32-bit flit FLT1 received into the memory B21 at a position selected by the module BW21. When a flit FLT1 is loaded into the memory B21, the corresponding validity bit BE1 is loaded into the memory EB21 at a corresponding position selected by the module BW21. The module DF21 comprises an addressing module BR21, which successively addresses each location in the memories B21 and EB21 to transfer a flit FLT1 to the output of the module ALK, if this flit is associated in the memory EB21 with a validity bit BE1 in the valid state. Each bit BE1 read in the memory EB21 and corresponding to a valid flit, is also supplied at the output of the module DF21.

Figure 5B:
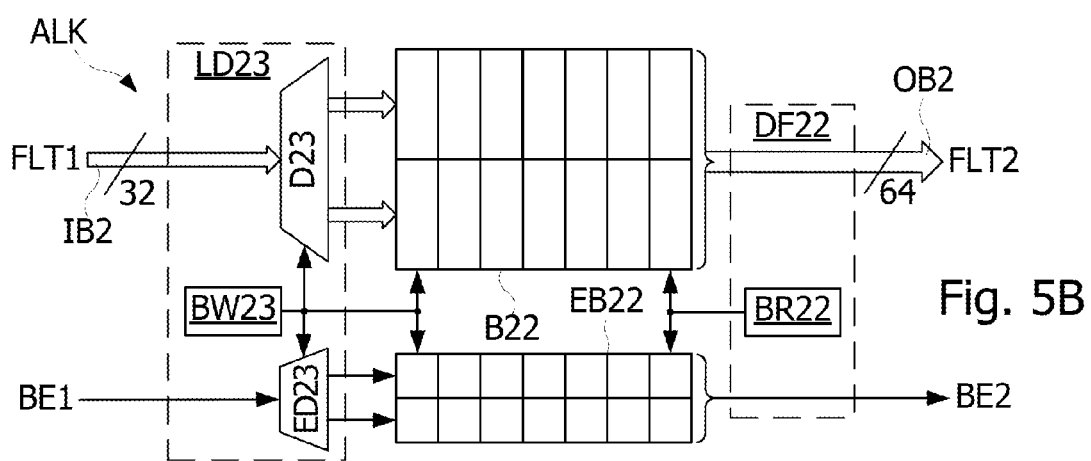

FIG. 5B shows the case in which the input bus IB2 of the module ALK has a width corresponding to the size of an elementary flit, i.e., for example 32 bits, and in which the output bus OB2 has a width corresponding to the size of two elementary flits, i.e., for example 64 bits. The module ALK comprises a loading module LD23, buffer memories for data B22 and for validity bits EB22 and a reading module DF22. The encoding module LD23 comprises an addressing module BW23 for addressing the memories B22 and EB22. The module LD23 also comprises demultiplexers D23, ED23 controlled by the module BW23. The demultiplexer D23 is used to store a 32-bit flit FLT1 received by the module LD23 in each 32-bit location of the memory B22. The demultiplexer ED23 is used to store a 1-bit validity bit BE1 received by the module LD23 in each 1-bit location of the memory EB22. The buffer memory B22 is designed for storing a few 64-bit words and can be addressed for example by 64-bit word. The buffer memory EB22 is provided for storing a few bits, which can for example be addressed in pairs. The memory EB22 is designed for storing one validity bit per elementary flit likely to be stored in the memory B22. The module BW23 is configured to successively select, using the multiplexers D23 and ED23, each free 32-bit location in the memory B22 and each corresponding 1-bit location in the memory EB22. The module LD23 loads each 32-bit flit FLT1 received into the memory B22 at a position selected by the module BW23. When a flit is loaded into the memory B22, a validity bit BE1 is loaded into the memory EB22 at a corresponding position, selected by the module BW23. The 1-bit locations not selected in the memory EB22 are put to the invalid state. The module DF22 comprises an addressing module BR22, which successively addresses each 64-bit location in the memory B22 and each 2-bit location BE2 in the memory EB22 to transfer a 64-bit flit FLT2 to the output of the module ALK, if this flit is associated with a pair of validity bits BE2, which are not simultaneously in the invalid state. Each pair of bits BE2 read in the memory EB22 and corresponding to a flit transferred to the output of the module NIj, is also supplied at the output of the module DF22.

Figure 5C:
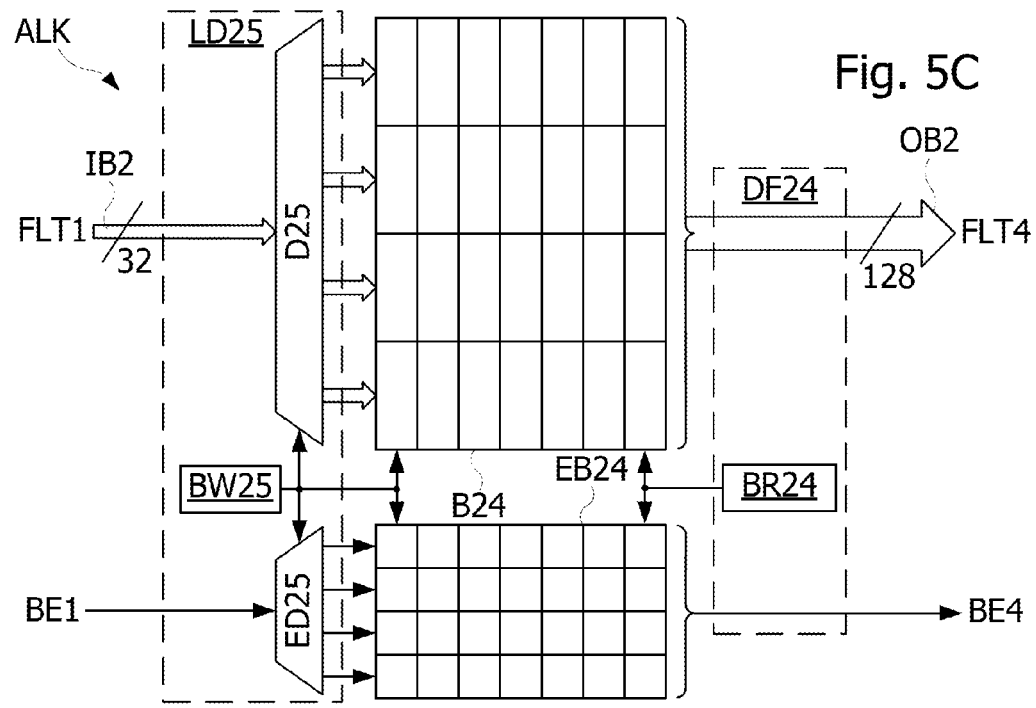

FIG. 5C shows the case in which the input bus IB2 of the module ALK has a width corresponding to the size of an elementary flit, i.e., for example 32 bits, and in which the output bus OB2 has a width corresponding to the size of four elementary flits, i.e., for example 128 bits. The module ALK comprises a loading module LD25, buffer memories for data B24 and for validity bits EB24 and a reading module DF24. The module LD25 comprises an addressing module BW25. The module BW25 addresses the memories B24 and EB24. The module LD25 also comprises demultiplexers D25, ED25 controlled by the module BW25. The demultiplexer D25 is used to store a 32-bit flit FLT1 received by the module LD25 in each 32-bit location of the memory B24. The demultiplexer ED25 is used to store a validity bit BE1 received by the module LD25 in each 1-bit location of the memory EB24. The buffer memory B24 is designed for storing a few 128-bit words and can be addressed for example by 128-bit word. The buffer memory EB24 is provided for storing a few bits, which can for example be addressed by groups of 4 bits. The memory EB24 is designed for storing one validity bit per elementary flit likely to be stored in the memory B24. The module BW25 is configured to successively select, using the multiplexers D25 and ED25, each free 32-bit location in the memory B24 and each corresponding 1-bit location in the memory EB24. The module LD25 loads each 32-bit flit FLT1 received into the memory B24 at a position selected by the module BW25. When a flit is loaded into the memory B14, a corresponding validity bit BE1 received is loaded into the memory EB24 at a corresponding position, selected by the module BW25. The 1-bit locations not selected in the memory EB24 are put to the invalid state. The module DF24 comprises an addressing module BR24, which successively addresses each 128-bit location in the memory B24 and each 4-bit location BE4 in the memory EB24 to transfer a 128-bit flit FLT4 to the output of the module ALK, if this flit is associated with a group of four validity bits BE4, which are not simultaneously in the invalid state. Each group of four bits BE4 read in the memory EB24 and corresponding to a flit transferred to the output of the module ALK, is also supplied at the output of the module DF24.

Figure 5D:
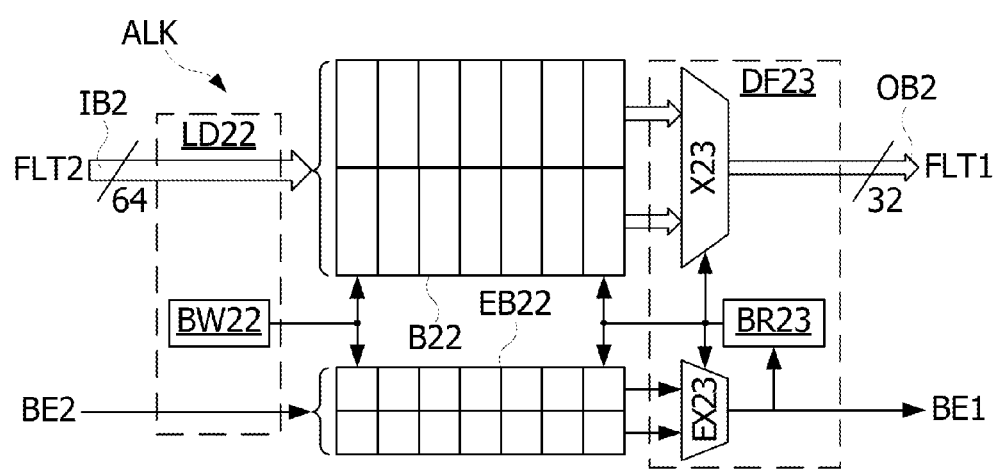

FIG. 5D shows the case in which the input bus IB2 of the module ALK has a width corresponding to the size of two elementary flits, i.e., for example 64 bits, and in which the output bus OB2 has a width corresponding to the size of an elementary flit, i.e., for example 32 bits. The module ALK comprises a loading module LD22, the buffer memories for data B22 and for validity bits EB22 (FIG. 5B) and a reading module DF23. The module LD22 comprises an addressing module BW22 for addressing the memories B22 and EB22. The module BW22 is configured to successively select each free 64-bit location in the memory B22 and each corresponding 2-bit location in the memory EB22. The module LD22 loads each 64-bit flit FLT2 received by the module LD22, into the memory B22 at a position selected by the module BW22. When a flit is loaded into the memory B22, a pair of validity bits BE2 received by the module LD22 is loaded into the memory EB22 at a corresponding position selected by the module BW22. The module DF23 comprises an addressing module BR23 and multiplexers X23, EX23.

The module BR23 successively addresses each 64-bit location in the memory B22 and each pair of validity bits stored in the memory EB22, and controls the multiplexers X23, EX23 to transfer to the output of the module ALK, a 32-bit flit FLT1 selected in the 64-bit flit FLT2 addressed by the module BR23, if this flit is associated with a validity bit BE1 selected in the memory EB22 by the multiplexer EX23 in the valid state. On the contrary, if the flit FLT1 addressed in the memory B22 and selected by the multiplexer X23 is invalid, it is not transmitted and is removed from the memory B22. Each bit BE1 read in the memory EB22 and corresponding to a flit FLT1 transferred to the output of the module ALK, is also supplied at the output of the module DF23.

Figure 5E:
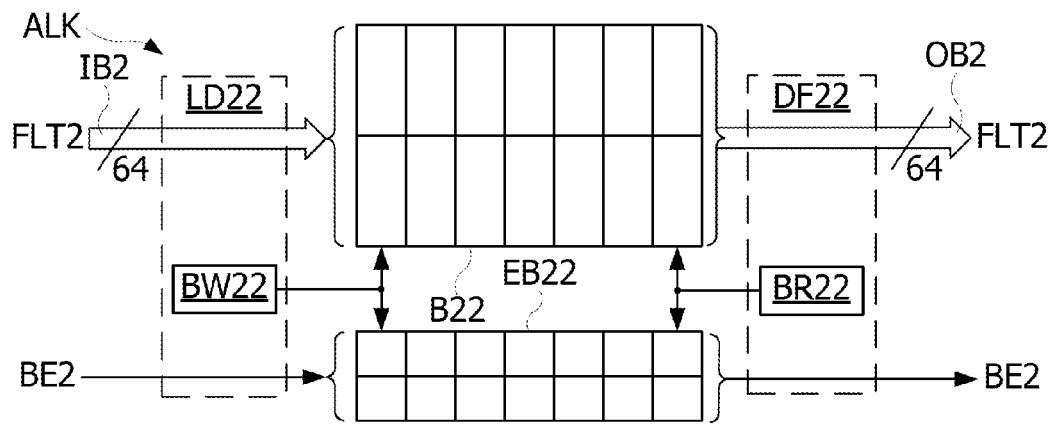

FIG. 5E shows the case in which the input IB2 and output OB2 buses of the module ALK have a width corresponding to the size of two elementary flits, i.e., for example 64 bits. The module ALK comprises the loading module LD22 (FIG. 5D), the buffer memories for data B22 and for validity bits EB22 (FIG. 5B), and the reading module DF22 (FIG. 5C).

Figure 5F:
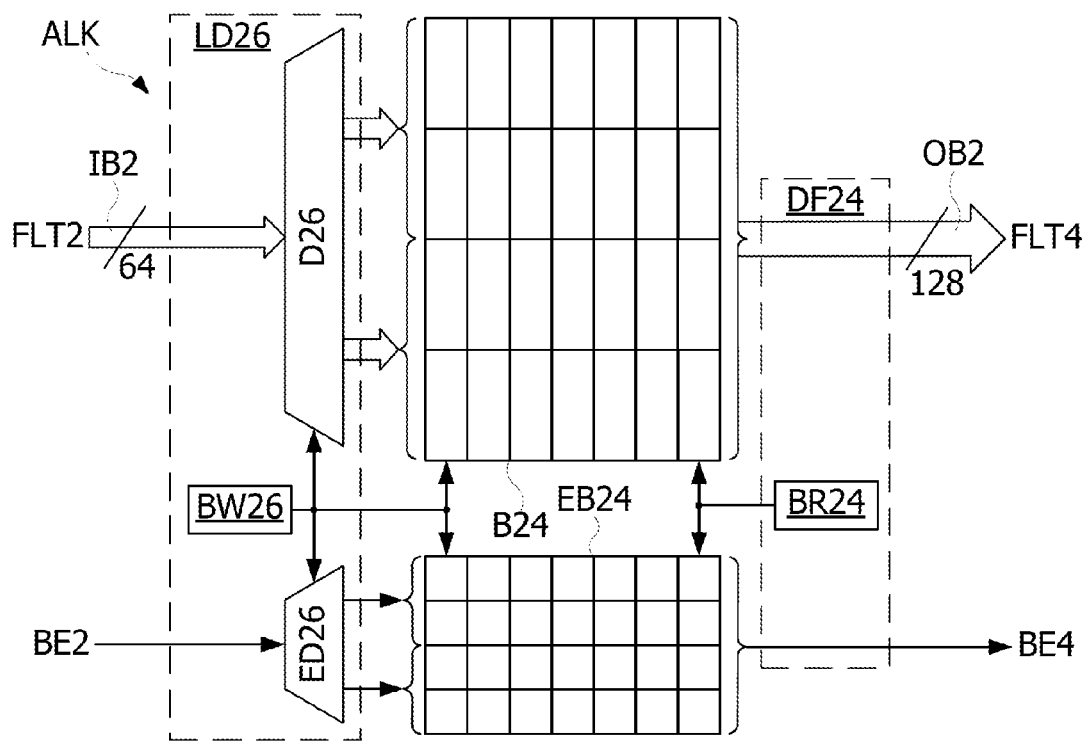

FIG. 5F shows the case in which the input bus IB2 has a width corresponding to the size of two elementary flits, i.e., for example 64 bits, and in which the output bus OB2 has a width corresponding to the size of four elementary flits, i.e., for example 128 bits. The module ALK comprises a loading module LD26, the buffer memories for data B24 and for validity bits EB24 (FIG. 5C) and the reading module DF24 (FIG. 5C). The module LD26 comprises an addressing module BW26 for addressing the memories B24 and EB24. The module LD26 also comprises demultiplexers D26, ED26 controlled by the module BW26. The demultiplexer D26 is used to store a 64-bit flit FLT2 received by the module LD26 in each 64-bit location of the memory B24. The demultiplexer ED26 is used to store a pair of validity bits BE2 received by the module LD26 in each 2-bit location of the memory EB24. The module BW26 is configured to successively select, using the demultiplexers D26 and ED26, each free 64-bit location in the memory B24 and each free 2-bit location in the memory EB24. The module LD26 loads each 64-bit flit FLT2 received into the memory B24 at a position selected by the module BW26 and by the demultiplexer D26 controlled by the module BW26. When a 64-bit flit FLT2 is loaded into the memory B24, a pair of validity bits BE2 received by the module LD26 is loaded into the memory EB24 at a corresponding position, selected by the module BW26. The 2-bit locations not selected in the memory EB24 are put to the invalid state.

Figure 5G:
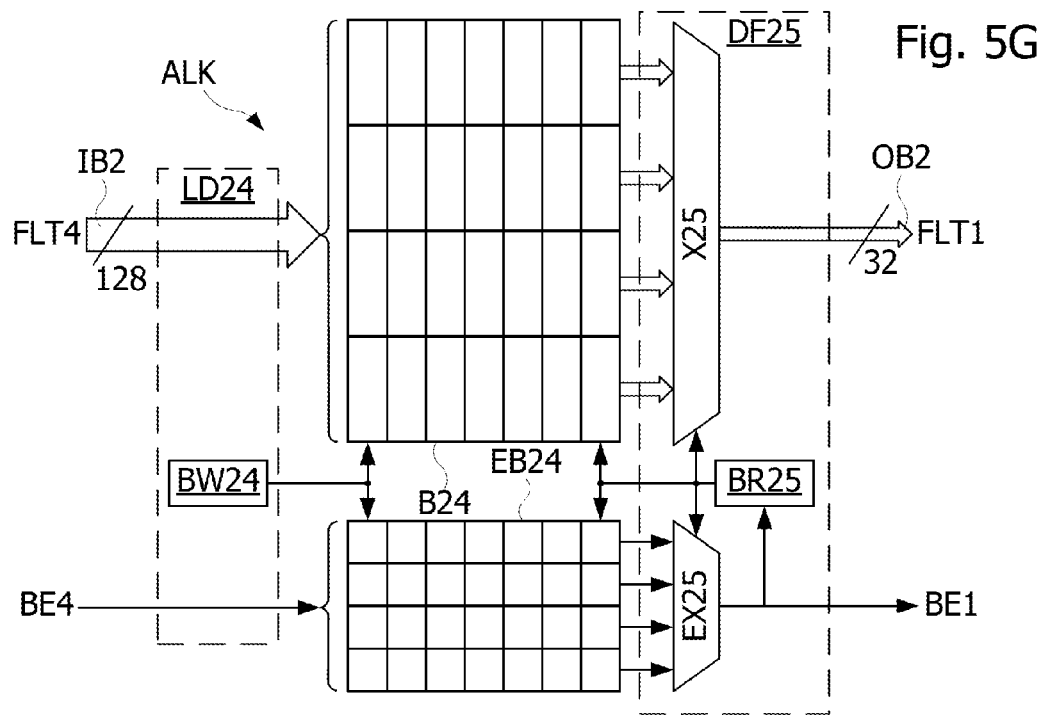

FIG. 5G shows the case in which the input bus IB2 of the module ALK has a width corresponding to the size of four elementary flits, i.e., for example 128 bits, and in which the output bus OB2 has a width corresponding to the size of one elementary flit, i.e., for example 32 bits. The module ALK comprises a loading module LD24, the buffer memories for data B24 and for validity bits EB24 (FIG. 5C) and a reading module DF25. The module LD24 comprises an addressing module BW24 for addressing the memories B24 and EB24. The module BW24 is configured to successively select each free 128-bit location in the memory B24 and each corresponding 4-bit location in the memory EB24. The module LD24 loads each 128-bit flit FLT4 received into the memory B24 at a position selected by the module BW24. When a 128-bit flit FLT4 is loaded into the memory B24, the module LD24 loads a group of four validity bits BE4 received at a corresponding position, selected by the module BW24 in the memory EB24. The module DF25 comprises an addressing module BR25 and multiplexers X25, EX25 controlled by the module BW25. The addressing module BR25 successively addresses each 128-bit location in the memory B24 and each 4-bit location BE4 in the memory EB24, and controls the multiplexers X25, EX25 to transfer a 32-bit flit FLT1 selected in the 128-bit flit FLT4 addressed by the module BR25, to the output of the module ALK, if this flit is associated with a validity bit BE1 in the valid state, selected by the multiplexer EX25 in the 4-bit location addressed by the module BR25 in the memory EB24. On the contrary, if the flit FLT1 addressed in the memory B24 and selected by the multiplexer X25 is invalid, it is not transmitted and is removed from the memory B24. Each bit BE1 read in the memory EB24 and corresponding to a valid flit, is also transferred to the output of the module ALK.

Figure 5H:
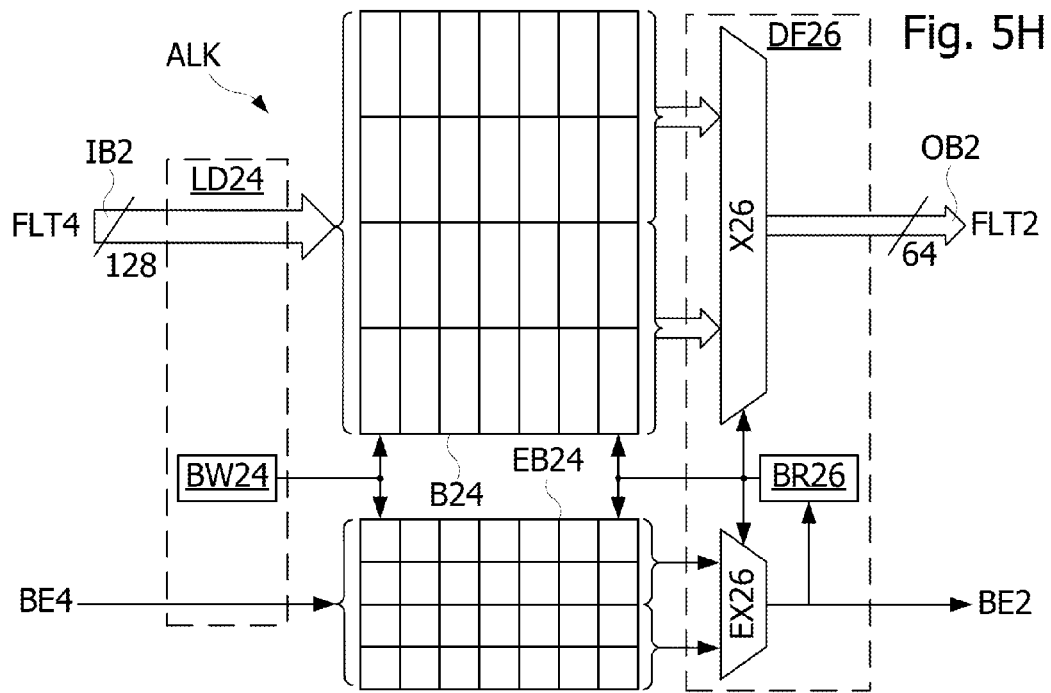

FIG. 5H shows the case in which the input bus IB2 of the module ALK has a width corresponding to the size of four elementary flits, i.e., for example 128 bits, and in which the output bus OB2 has a width corresponding to the size of two elementary flits, i.e., for example 64 bits. The module ALK comprises the loading module LD24 (FIG. 5G), the buffer memories for data B24 and for validity bits EB24 (FIG. 5C) and a reading module DF26. The module DF26 comprises an addressing module BR26 and multiplexers X26, EX26 controlled by the module BW26. The addressing module BR16 successively addresses each 128-bit location in the memory B14 and each corresponding 4-bit location BE4 in the memory EB24, and controls the multiplexers X26, EX26 to transfer a 64-bit flit FLT2 selected in the 128-bit flit FLT4 addressed by the module BR26, to the output of the module ALK, if this flit is associated with a pair of validity bits BE2 selected by the multiplexer EX26 at least one bit of which is in the valid state. On the contrary, if the flit FLT2 addressed in the memory B24 and selected by the multiplexer X26 is invalid, it is not transmitted and is removed from the memory B24. Each pair of bits BE2 read in the memory EB24 and corresponding to a flit transferred to the output of the module NIj, is also transferred to the output of the module ALK.

Figure 5I:
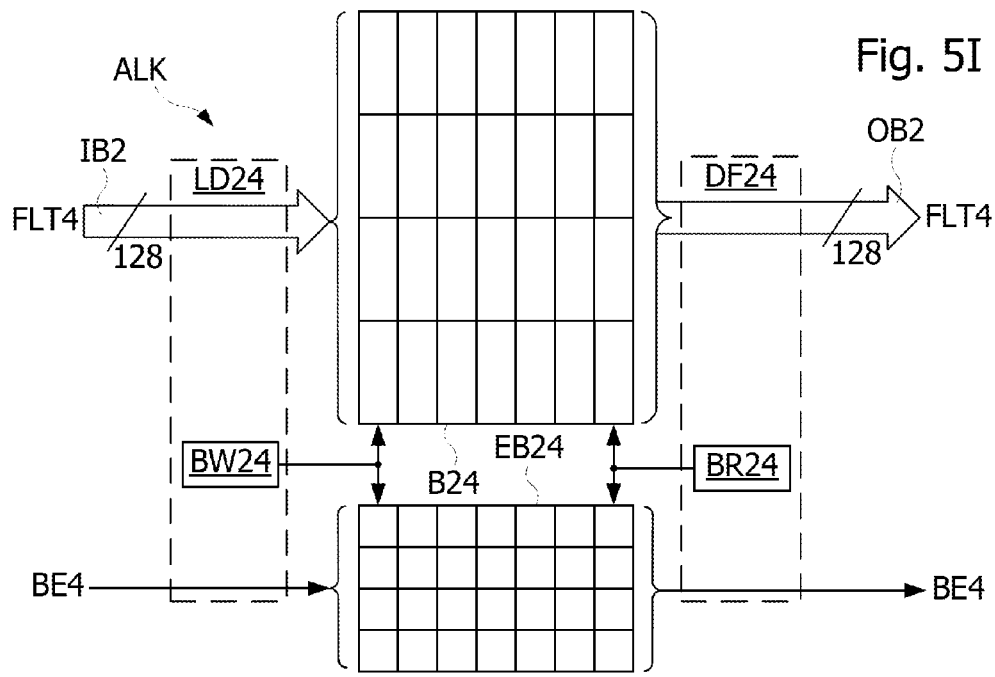

FIG. 5I shows the case in which the input IB2 and output OB2 buses of the module ALK have a width corresponding to the size of four elementary flits, i.e., for example 128 bits. The module ALK comprises the loading module LD24 (FIG. 5G), the buffer memories for data B24 and for validity bits EB24 (FIG. 5C), and the reading module DF24 (FIG. 5C).

The link modules ALK in FIGS. 5A, 5E and 5I do not perform any bus width conversion, but may perform a clock frequency conversion, and/or repeat the data transmitted when the link length on which the conversion module is located is too long.

Figure 6A:
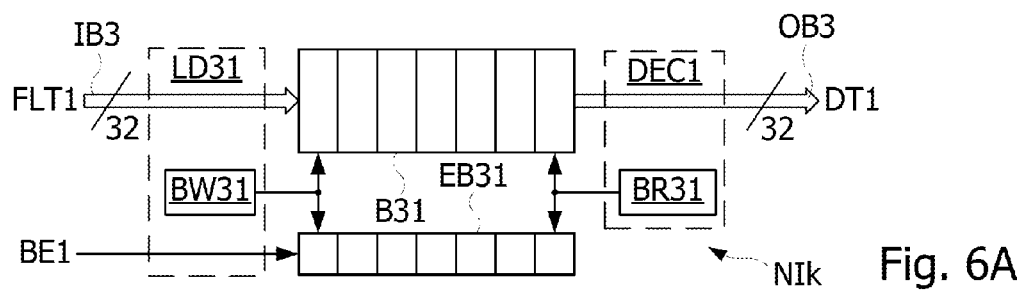

FIGS. 6A to 6I represent in greater detail different embodiments of data receive circuits of the interface module NIk, depending on the width of the input IB3 and output OB3 buses of the module NIk. FIG. 6A shows the case in which the input IB3 and output OB3 buses of the module NIk have a width corresponding to the size of one elementary flit, i.e., for example 32 bits. The module NIk comprises a loading module LD31, buffer memories for data B31 and for validity bits EB31 and a decoding module DEC1. The module LD31 comprises an addressing module BW31 for addressing the buffer memories B31 and EB31. The buffer memory B31 is designed for storing a few 32-bit words and can be addressed by 32-bit word. The buffer memory EB31 is provided for storing a few validity bits BE1 received by the module LD31 and which can for example be addressed individually. The memory EB31 is designed for storing one validity bit per elementary flit likely to be stored in the memory B31. The module BW31 is configured to successively select each free 32-bit location in the memory B31 and each corresponding 1-bit location in the memory EB31.

The module LD31 loads each 32-bit flit FLT1 received into the memory B31 at a position selected by the module BW31. When a flit is loaded into the memory B31, the corresponding validity bit BE1 received is loaded into the memory EB31 at a corresponding position selected by the module BW31. The module DEC1 comprises an addressing module BR31, which successively addresses each location in the memories B31 and EB31 to transfer a flit FLT1 to the output of the module NIk, if this flit is associated with a validity bit BE1 in the valid state.

Figure 6B:
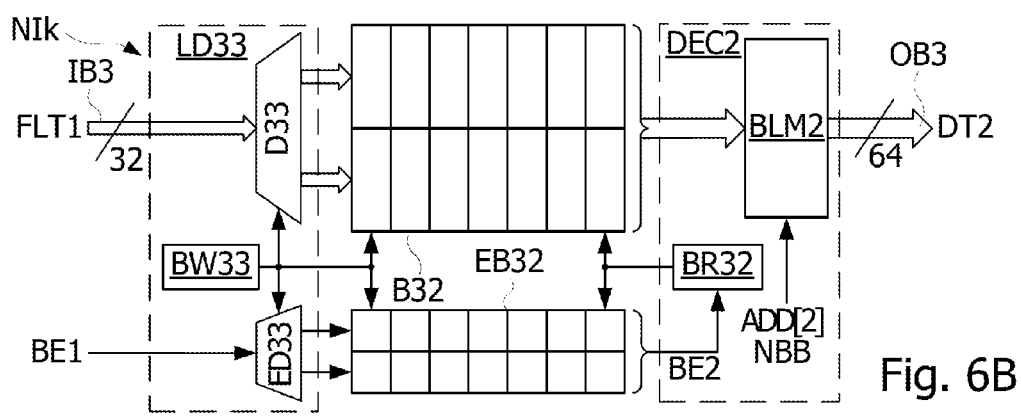

FIG. 6B shows the case in which the input bus IB3 of the module NIk has a width corresponding to the size of one elementary flit, i.e., for example 32 bits, and in which the output bus OB3 has a width corresponding to the size of two elementary flits, i.e., for example 64 bits. The module NIk comprises a loading module LD33, buffer memories for data B32 and for validity bits EB32 and a decoding module DEC2. The encoding module LD33 comprises an addressing module BW33 for addressing the memories B32 and EB32. The module LD33 also comprises demultiplexers D33, ED33 controlled by the module BW33. The demultiplexer D33 is used to store a 32-bit flit received by the module LD33 in each 32-bit location of the memory B32. The demultiplexer ED33 is used to store a 1-bit validity bit BE1 received by the module LD33 in each 1-bit location of the memory EB32. The buffer memory B32 is designed for storing a few 64-bit words and can be addressed for example by 64-bit word. The buffer memory EB32 is provided for storing a few bits, which can for example be addressed in pairs. The memory EB32 is designed for storing one validity bit per elementary flit likely to be stored in the memory B32. The module BW33 is configured to successively select, using the demultiplexers D33 and ED33, each free 32-bit location in the memory B32 and each corresponding 1-bit location in the memory EB32. The module LD33 loads each 32-bit flit FLT1 received into the memory B32 at a position selected by the module BW33. When a flit is loaded into the memory B32, a validity bit BE1 is loaded into the memory EB32 at a corresponding position, selected by the module BW33. The 1-bit locations not selected in the memory EB32 are put to the invalid state. The module DEC2 comprises an addressing module BR32, and a switch matrix BLM2. The module BR32 successively addresses each 64-bit location in the memory B32 and each 2-bit location BE2 in the memory EB32 to transfer a 64-bit flit FLT2 to the output of the module NIk, if this flit is associated with a pair of validity bits BE2, which are not simultaneously in the invalid state. The matrix BLM2 receives the flits FLT2 at output of the memory B32 and inverts if necessary the 32-bit elementary flits in the flits FLT2.

Figure 6C:
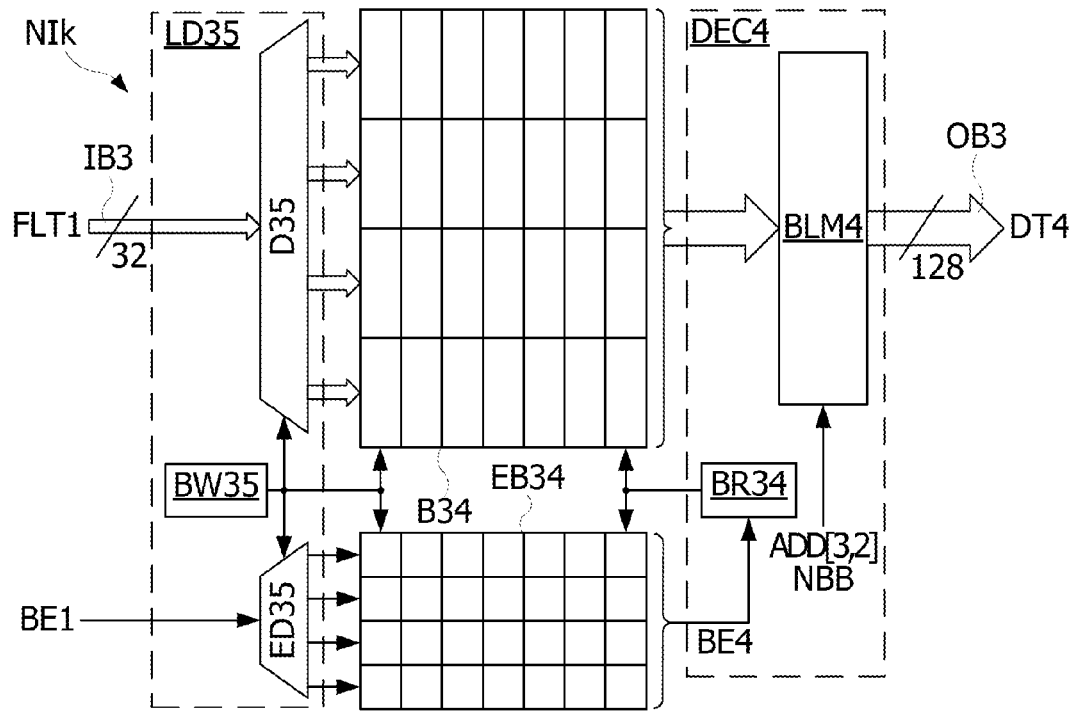

FIG. 6C shows the case in which the input bus IB3 of the module NIk has a width corresponding to the size of one elementary flit, i.e., for example 32 bits, and in which the output bus OB3 has a width corresponding to the size of four elementary flits, i.e., for example 128 bits. The module NIk comprises a loading module LD35, buffer memories for data B34 and for validity bits EB34 and a decoding module DEC4. The module LD35 comprises an addressing module BW35. The module BW35 addresses the memories B34 and EB34. The module LD35 also comprises demultiplexers D35, ED35 controlled by the module BW35. The demultiplexer D35 is used to store a 32-bit flit FLT1 received by the module LD35 in each 32-bit location of the memory B34. The demultiplexer ED35 is used to store a validity bit BE1 received by the module LD35 in each 1-bit location of the memory EB34. The buffer memory B34 is designed for storing a few 128-bit words and can be addressed for example by 128-bit word. The buffer memory EB34 is provided for storing a few bits, which can for example be addressed by groups of 4 bits. The memory EB34 is designed for storing one validity bit per elementary flit likely to be stored in the memory B34. The module BW35 is configured to successively select, using the multiplexers D35 and ED35, each free 32-bit location in the memory B34 and each corresponding 1-bit location in the memory EB34. The module LD35 loads each 32-bit flit FLT1 received into the memory B34 at a position selected by the module BW35. When a flit is loaded into the memory B14, a corresponding validity bit BE1 received is loaded into the memory EB34 at a corresponding position, selected by the module BW35. The 1-bit locations not selected in the memory EB34 are put to the invalid state. The module DEC4 comprises an addressing module BR34, and a switch matrix BLM4. The module BR34 successively addresses each 128-bit location in the memory B34 and each 4-bit location BE4 in the memory EB34 to transfer a 128-bit flit FLT4 to the output of the module NIk, if this flit is associated with a group of four validity bits BE4, which are not all in the invalid state. The matrix BLM4 receives the flits FLT4 at output of the memory B34 and redistributes if necessary the 32-bit elementary flits in the flits FLT4.

Figure 6D:
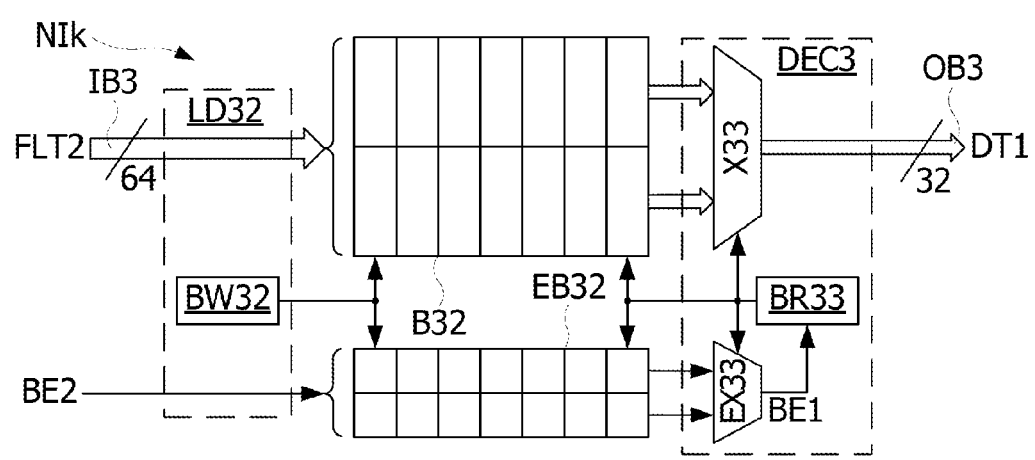

FIG. 6D shows the case in which the input bus IB3 of the module NIk has a width corresponding to the size of two elementary flits, i.e., for example 64 bits, and in which the output bus OB3 has a width corresponding to the size of one elementary flit, i.e., for example 32 bits. The module NIk comprises a loading module LD32, the buffer memories for data B32 and for validity bits EB32 (FIG. 6B) and a decoding module DEC3. The module LD32 comprises an addressing module BW32 for addressing the memories B32 and EB32. The module BW32 is configured to successively select each free 64-bit location in the memory B32 and each corresponding bit-pair location in the memory EB32. The module LD32 loads each 64-bit flit FLT2 received by the module LD32, into the memory B32 at a position selected by the module BW32. When a flit is loaded into the memory B32, a pair of validity bits BE2 received by the module LD32 is loaded into the memory EB32 at a corresponding position selected by the module BW32. The module DEC3 comprises an addressing module BR13 and multiplexers X33, EX33. The module BR33 successively addresses each 64-bit location in the memory B32 and each corresponding pair of validity bits stored in the memory EB32, and controls the multiplexers X33, EX33 to transfer to the output of the module NIk, a 32-bit flit FLT1 selected in the 64-bit flit FLT2 addressed by the module BR33, if this flit is associated with a validity bit BE1 selected by the multiplexer EX33 in the valid state. On the contrary, if the flit FLT1 addressed in the memory B32 and selected by the multiplexer X33 is invalid, it is not transmitted and is removed from the memory B32.

Figure 6E:
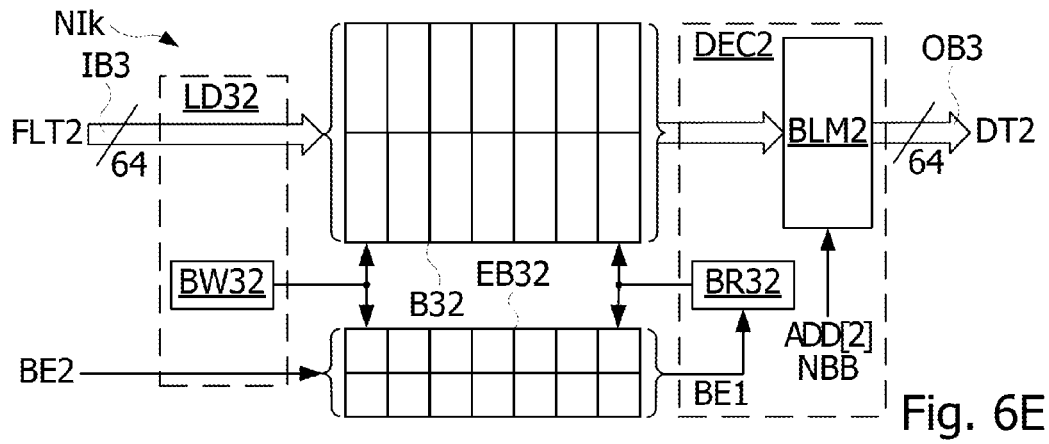

FIG. 6E shows the case in which the input IB3 and output OB3 buses of the module NIk have a width corresponding to the size of two elementary flits, i.e., for example 64 bits. The module NIk comprises the loading module LD32 (FIG. 6D), the buffer memories for data B32 and for validity bits EB32 (FIG. 6B), and the reading module DEC2 (FIG. 6B).

Figure 6F:
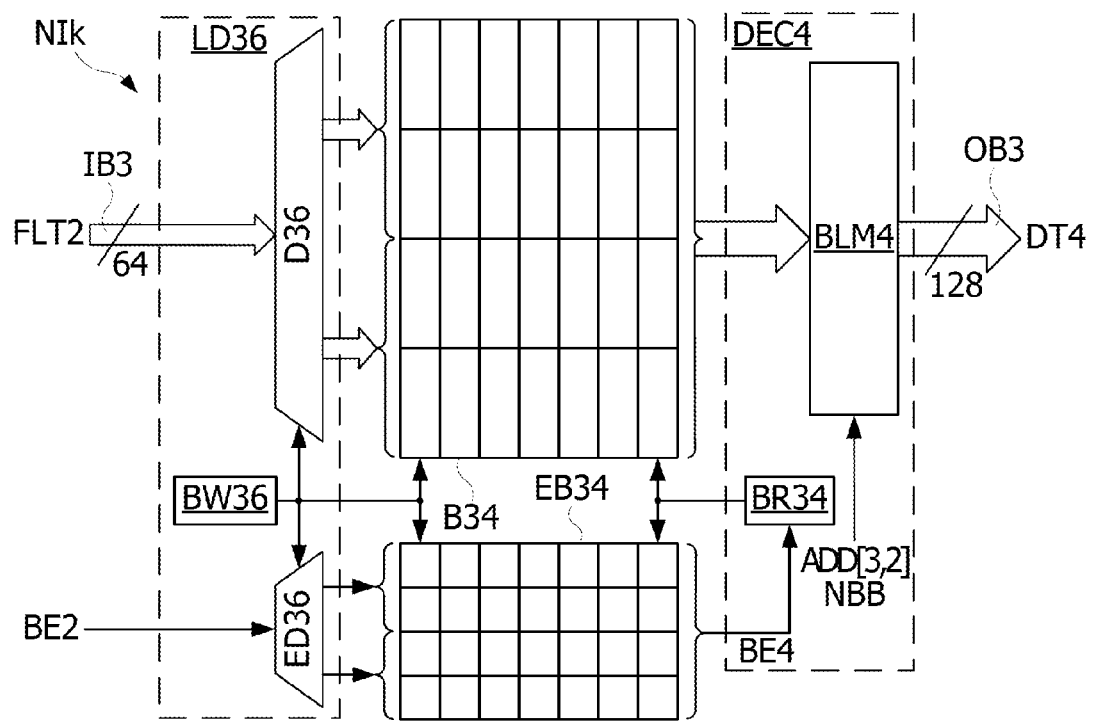

FIG. 6F shows the case in which the input bus IB3 of the module NIk has a width corresponding to the size of two elementary flits, i.e., for example 64 bits, and in which the output bus OB3 has a width corresponding to the size of four elementary flits, i.e., for example 128 bits. The module NIk comprises a loading module LD36, the buffer memories for data B34 and for validity bits EB34 (FIG. 6C) and the decoding module DEC4 (FIG. 6C). The module LD36 comprises an addressing module BW36 for addressing the memories B34 and EB34. The module LD36 also comprises demultiplexers D36, ED36 controlled by the module BW36. The demultiplexer D36 is used to store a 64-bit flit FLT2 received by the module LD36 in each 64-bit location of the memory B34. The demultiplexer ED36 is used to store two validity bits BE2 received by the module LD36 in each 2-bit location of the memory EB34. The module BW36 is configured to successively select, using the demultiplexers D36 and ED36, each free 64-bit location in the memory B34 and each corresponding 2-bit location in the memory EB34. The module LD36 loads each 64-bit flit FLT2 received into the memory B34 at a position selected by the module BW36 and by the demultiplexer D36 controlled by the module BW36. When a 64-bit flit FLT2 is loaded into the memory B34, a pair of validity bits BE2 received by the module LD36 is loaded into the memory EB34 at a corresponding position, selected by the module BW36. The 2-bit locations not selected in the memory EB34 are put to the invalid state.

Figure 6G:
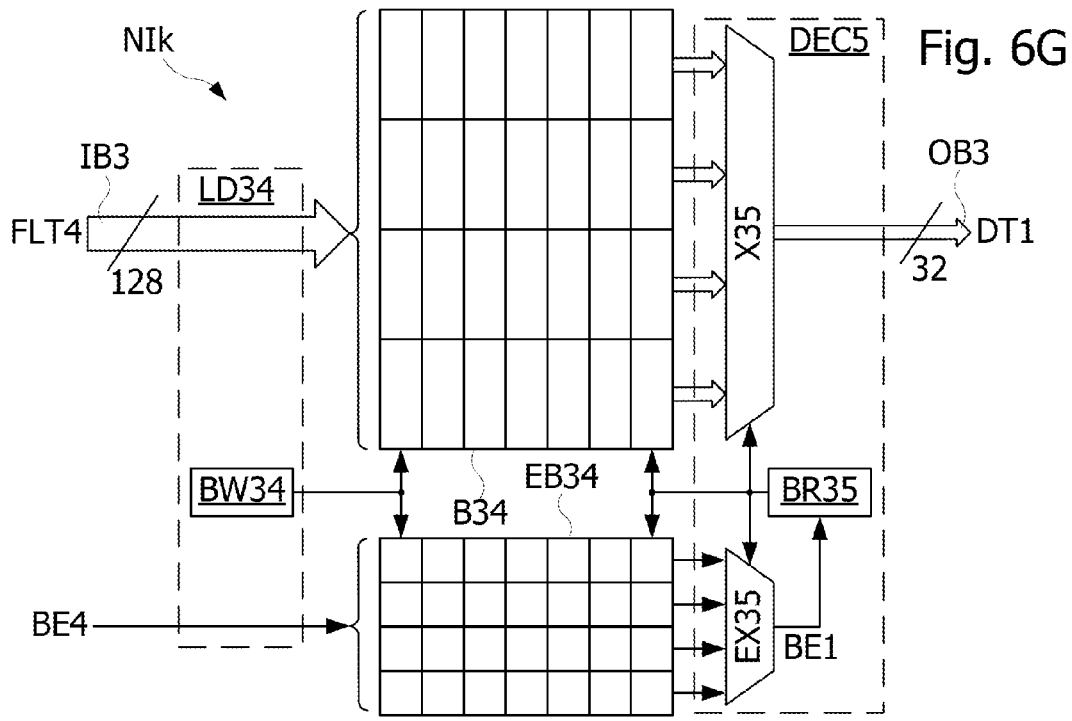

FIG. 6G shows the case in which the input bus IB3 of the module NIk has a width corresponding to the size of four elementary flits, i.e., for example 128 bits, and in which the output bus OB3 has a width corresponding to the size of one elementary flit, i.e., for example 32 bits. The module NIk comprises a loading module LD34, the buffer memories for data B34 and for validity bits EB34 (FIG. 6C) and a decoding module DEC5. The module LD34 comprises an addressing module BW34 for addressing the memories B34 and EB34. The module BW34 is configured to successively select each free 128-bit location in the memory B34 and each corresponding 4-bit location in the memory EB34. The module LD34 loads each 128-bit flit FLT4 received into the memory B34 at a position selected by the module BW34. When a 128-bit flit FLT4 is loaded into the memory B34, the module LD34 loads a group of four validity bits BE4 received at a corresponding position, selected by the module BW34. The module DEC5 comprises an addressing module BR35 and multiplexers X35, EX35 controlled by the module BW35. The addressing module BR35 successively addresses each 128-bit location in the memory B34 and each 4-bit location BE4 in the memory EB34, and controls the multiplexers X35, EX35 to transfer a 32-bit flit FLT1 selected in the 128-bit flit FLT4 addressed by the module BR35, to the output of the module NIk, if this flit is associated with a validity bit BE1 selected by the multiplexer EX35 in the valid state. On the contrary, if the flit FLT1 addressed in the memory B34 and selected by the multiplexer X35 is invalid, it is not transmitted and is removed from the memory B34.

Figure 6H:
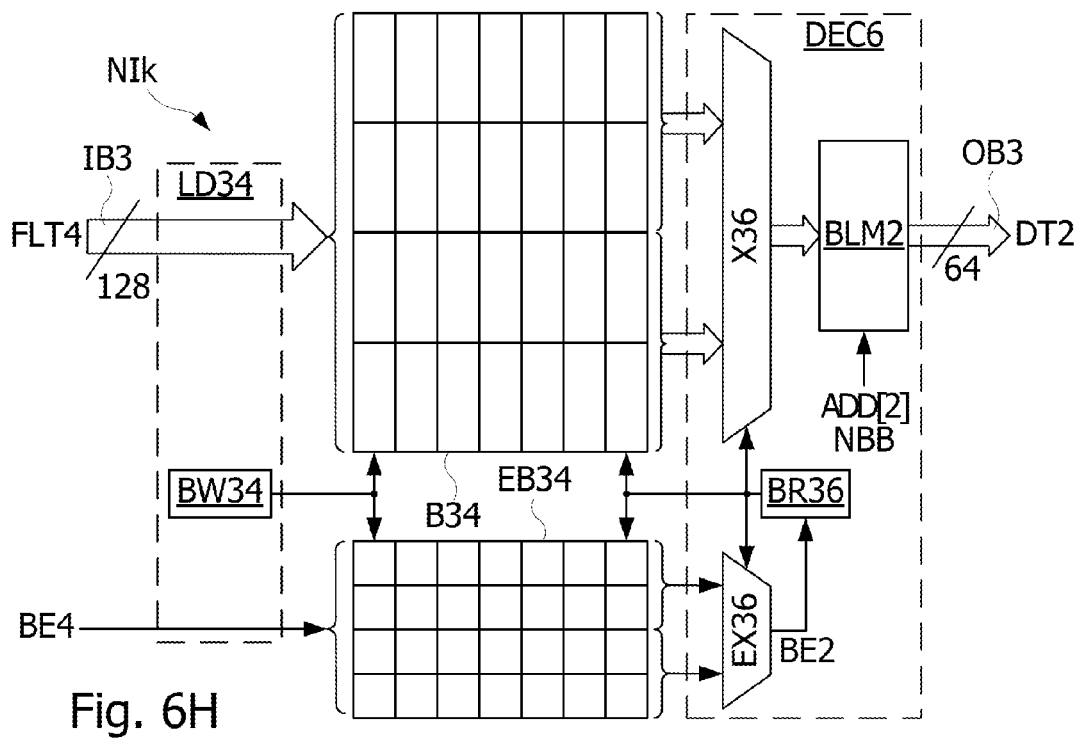

FIG. 6H shows the case in which the input bus IB3 of the module NIk has a width corresponding to the size of four elementary flits, i.e., for example 128 bits, and in which the output bus OB3 has a width corresponding to the size of two elementary flits, i.e., for example 64 bits. The module NIk comprises the loading module LD34 (FIG. 6G), the buffer memories for data B34 and for validity bits EB34 (FIG. 6C) and a decoding module DEC6. The module DEC6 comprises an addressing module BR36, multiplexers X36, EX36 controlled by the module BW36 and the matrix BLM2. The addressing module BR36 successively addresses each 128-bit location in the memory B14 and each 4-bit location BE4 in the memory EB34, and controls the multiplexers X36, EX36 to transfer a 64-bit flit FLT2 selected in the 128-bit flit FLT4 addressed by the module BR36, to the output of the module NIk, if this flit is associated with a pair of validity bits BE2 selected by the multiplexer EX36 at least one bit of which is in the valid state. On the contrary, if the flit FLT2 addressed in the memory B34 and selected by the multiplexer X36 is invalid, it is not transmitted and is removed from the memory B34. The matrix BLM2 receives the flits FLT2 at output of the multiplexer X36 and inverts if necessary the 32-bit elementary flits in the flits FLT2.

Figure 6I:
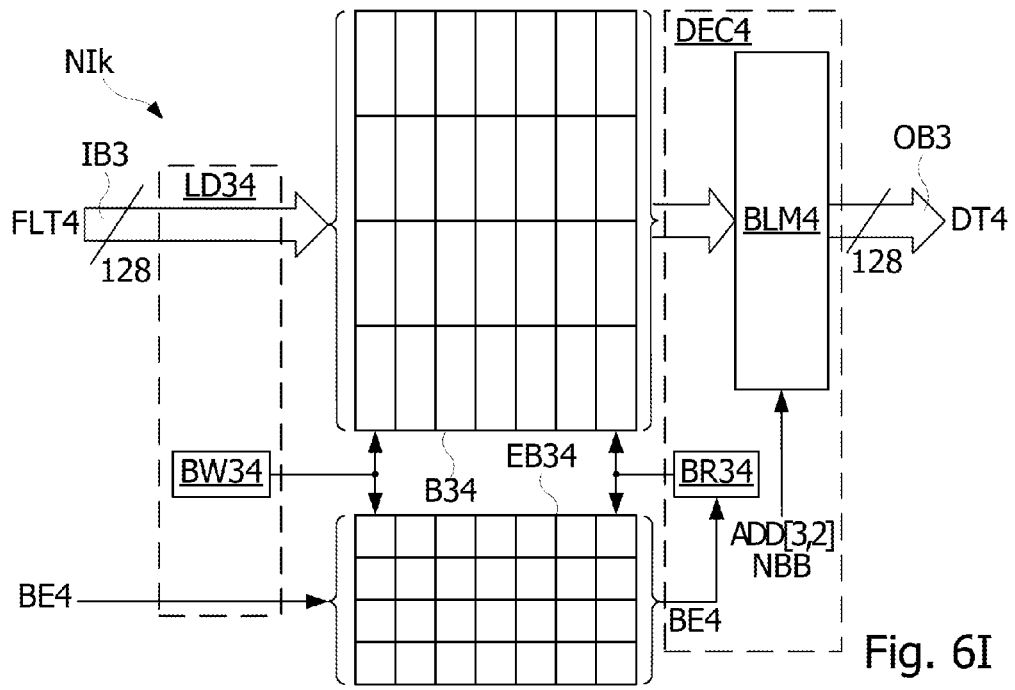

FIG. 6I shows the case in which the input IB3 and output OB3 buses of the module NIk have a width corresponding to the size of four elementary flits, i.e., for example 128 bits. The module NIk comprises the loading module LD34 (FIG. 6G), the buffer memories for data B34 and for validity bits EB34 (FIG. 6C), and the decoding module DEC4 (FIG. 6C).

The interface modules NIk in FIGS. 6A, 6E and 6I do not locally perform any bus width conversion, but may perform a communication protocol and/or clock frequency conversion.

It goes without saying that the multiplexers X13, EX13 (FIG. 4D), X15, EX15 (FIG. 4G), X16, EX16 (FIG. 4H), X23, EX23 (FIG. 5D), X25, EX25 (FIG. 5G), X26, EX26 (FIG. 5H), X33, EX33 (FIG. 6D), X35, EX35 (FIG. 6G), X36, EX36 (FIG. 6H), can be placed, not downstream, but upstream from the buffer memories B12, EB12, B14, EB14, B22, EB22, B24, EB24, B32, EB32, B34, EB34. In this case, the buffer memories B12, EB12, B22, EB22, B32, EB32 can be replaced with the memories B11, EB11, B21, EB21, B31, EB31, and the memories B14, EB14, B24, EB24, B34, EB34, replaced with the memories B12, EB12, B22, EB22, B32, EB32.

Figure 7:
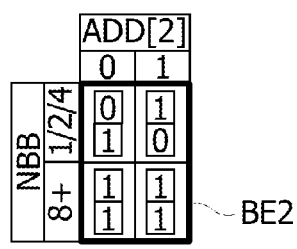
FIGS. 7 and 8 represent tables of values of validity bits implemented by the network interface modules according to a number of words to be transferred in the network and to a target address of the words to be transferred according to one embodiment, FIGS. 9A and 9B and 10A to 10D schematically represent switch matrices of data transferred in the network, implemented by the network interface modules.

FIG. 7 represents a table indicating the value of the pairs of validity bits BE2, implemented by the module EBC2 (FIGS. 4D and 4F) when the output bus of the interface module has a width corresponding to the size of two elementary flits. In this table, the value of the pairs BE2 depends on the third least significant bit ADD[2] of a target address ADD of the message to be transmitted DT2, and on a number of words NBB making up the message DT2, each address value enabling one word to be located. For request messages, the necessary address bits ADD[2,3] and the number NBB appear in heading data of the message. For response messages, the address ADD and the number NBB come from the module sending the response, or are found in registers of the interface module NIk connected to the module sending the response message. One word corresponds for example to one byte. If the number NBB is equal to 1, 2 or 4, i.e., if the message has a size smaller than or equal to that of one elementary flit (32 bits), the pair BE2 is equal to "01" if the bit ADD[2] is equal to 0 and "10" if the bit ADD[2] is equal to 1. When the pair BE2 is equal to "01", this means that the corresponding flit FLT2 comprises a valid elementary flit in first position and an invalid elementary flit in second position. When the pair BE2 is equal to "10", this means that the corresponding flit FLT2 comprises an invalid elementary flit in first position and a valid elementary flit in second position. If the number NBB is greater than or equal to 8, i.e., if the message has a size greater than that of an elementary flit, the pair BE2 is equal to "11" irrespective of the value of the bit ADD[2], which means that the corresponding flit FLT2 comprises two valid elementary flits.

Figure 8:
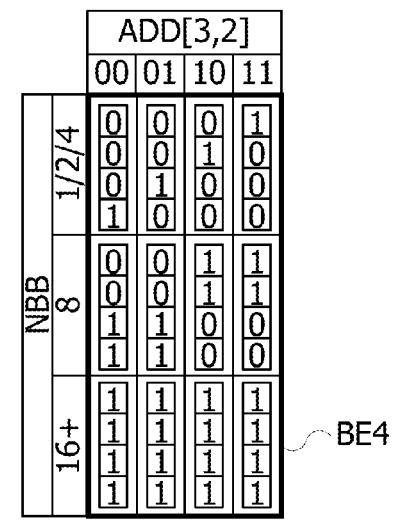

FIG. 8 represents a table indicating the value of the groups of four validity bits BE4, implemented by the module EBC4 (FIGS. 4G to 4I) when the output bus of the interface module NIj has the width corresponding to four elementary flits. In this table, the value of the groups of four validity bits BE4 depends on the fourth and third least significant bits ADD [3,2] of the target address ADD of the message to be transmitted DT4 and on the number of words NBB making up the message DT4. If the number NBB is equal to 1, 2 or 4 (the message has a size smaller than or equal to that of an elementary flit, i.e., 32 bits), the group BE4 is equal to "0001" if the bits ADD[3,2] are equal to "00", "0010" if the bits ADD[3,2] are equal to "01", "0100" if the bits ADD[3,2] are equal to "10", and "1000" if the bits ADD[3,2] are equal to "11". When the group BE4 is equal to "0001", this means that the corresponding flit FLT4 comprises one valid elementary flit in first position and three invalid elementary flits in second, third and fourth positions. When the group BE4 is equal to "0010", this means that the corresponding flit FLT4 comprises an invalid elementary flit in first position, a valid elementary flit in second position and invalid elementary flits in third and fourth positions. More generally, each bit on 0 of the group BE4 indicates that the corresponding elementary flit of the flit FLT4 is invalid, and each bit on 1 of the group BE4 indicates that the corresponding elementary flit is valid. If the number NBB is equal to 8 (the message has the size of two elementary flits, i.e., 64 bits), the group BE4 is equal to "0011" if the bit ADD[3] is equal to 0 and "1100" if the bit ADD[3] is equal to 1. If the number NBB is greater than or equal to 16 (the message has a size greater than or equal to that of four elementary flits, i.e., 128 bits), the group BE4 is equal to "1111" indicating that all the elementary flits of the corresponding flit FLT are valid.

Figure 9A:
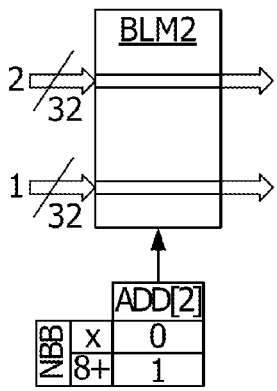
Figure 9B:
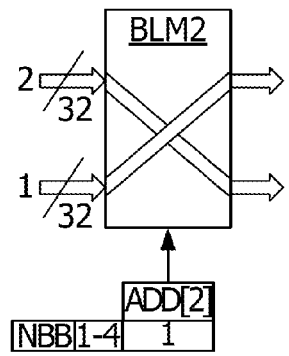

The switch matrices BLM2, BLM4 can apply to a received flit a circular permutation of the elementary flits constituting the flit when the size NBB of the message received is smaller than or equal to half the size of a flit transmitted by the output bus of the module NIk. FIGS. 9A, 9B represent the configuration of the switch matrix BLM2 (FIGS. 6B, 6E, 6H) when the output bus of the interface module NIk has a width corresponding to the size of two elementary flits. The configuration of the matrix BLM2 depends on the number of words NBB making up the message DT2, and on the value of the third least significant bit ADD[2] of the target address ADD of the message to be transmitted DT2. FIG. 9A shows the cases in which the bit ADD[2] is equal to 0, and in which the bit ADD[2] is equal to 1 when the number NBB in the message DT2 is greater than or equal to 8. In these cases, the matrix BLM2 does not change the order of the two elementary flits constituting the flit FLT2.

FIG. 9B shows the case in which the bit ADD[2] is equal to 1 when the number NBB in the message DT2 is lower than or equal to 4 (the message received occupies at the most a single elementary flit and thus at the most half a flit transmitted by the output bus). In this case, the matrix BLM2 performs an inversion of the two elementary flits constituting the flit FLT2. Such an inversion is equivalent to a circular permutation of one elementary flit rank.

Figure 10A:
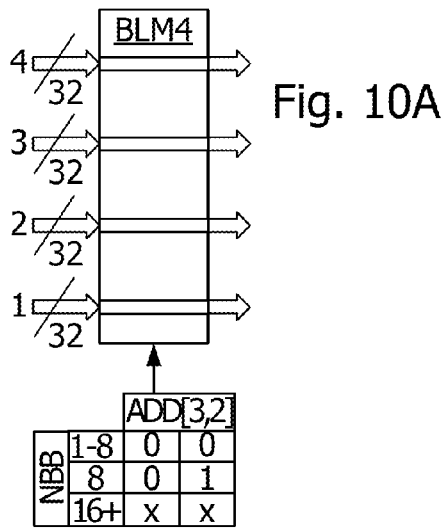

FIGS. 10A, 10B, 10C and 10D represent the configuration of the switch matrix BLM4 (FIGS. 6C, 6F, 6I) when the output bus of the interface module NIk has a width corresponding to the size of four elementary flits. The configuration of the matrix BLM4 depends on the fourth and third least significant bits ADD[3,2] of the target address ADD of the message to be transmitted DT4, when the number NBB in the message DT4 is lower than or equal to 8. FIG. 10A shows the cases in which the bits ADD[3,2] are equal to "00" when the number NBB is lower than or equal to 8, in which the bits ADD[3,2] are equal to "01" when the number NBB is equal to 8, and in which the number NBB is greater than 8. In these cases, the matrix BLM4 does not redistribute the four elementary flits constituting the flit FLT4.

Figure 10B:
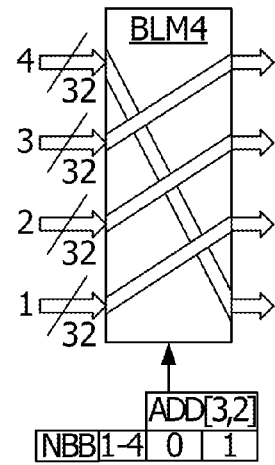

FIG. 10B shows the case in which the bits ADD[3,2] are equal to "01" when the number NBB is lower than or equal to 4. Therefore, the message received occupies at the most a single elementary flit and thus at the most one quarter of a flit transmitted by the output bus. In this case, the matrix BLM4 performs a circular permutation of the elementary flits constituting the flit FLT4 by increasing by one their respective ranks (from 1 to 4) in the flit FLT4, the last elementary flit 1 changing to the first position.

Figure 10C:
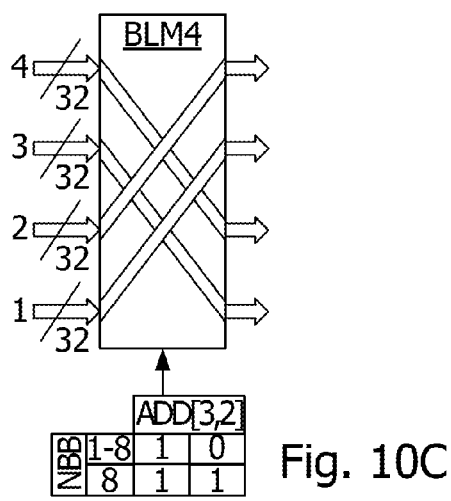

FIG. 10C shows the cases in which the bits ADD[3,2] are equal to "10" when the number NBB is lower than or equal to 8 and in which the bits ADD[3,2] are equal to "11" when the number NBB is equal to 8. Therefore, the message received occupies at the most two elementary flits and thus at the most half a flit transmitted by the output bus. In these cases, the matrix BLM4 performs an inversion of the two pairs (1, 2), (3, 4) of consecutive elementary flits constituting the flit FLT4 (circular permutation of two ranks of elementary flits).

Figure 10D:
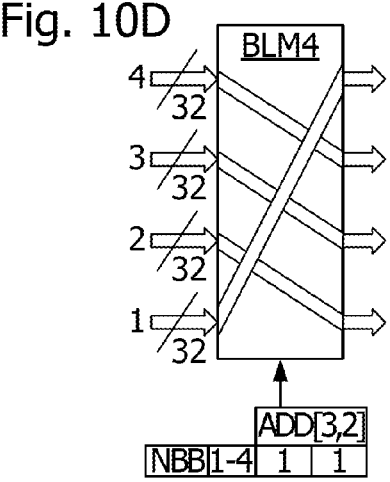

FIG. 10D shows the case in which the bits ADD[3,2] are equal to "11" when the number NBB is lower than or equal to 4. Therefore, the message occupies at the most a single elementary flit and thus at the most one quarter of a flit transmitted by the output bus. In this case, the matrix BLM4 performs a circular permutation of the elementary flits constituting the flit FLT4, by decreasing by one their respective ranks (from 1 to 4) in the flit FLT4, the first elementary flit 4 changing to the last position.

It shall be noted that in FIGS. 7 to 10D, the bits of the target address ADD used depend on the different widths of the links and the buses of the network NT. If a link or a bus having other widths is implemented in the network NT, other bits of the address ADD can be used to determine the values of the validity bits and the configurations of the switch matrices.

As a result of these provisions, the non-valid elementary flits can be identified by the validity bits BE1, BE2, BE4, and thus, may not be transmitted unnecessarily in the case of a conversion of a bus having a certain width towards a less wide bus. Furthermore, upon a conversion from a bus having a certain width towards a wider bus, the switch matrices enable the valid elementary flits to be correctly placed onto the lines of the wider bus, taking into account the target address of the data transmitted.

The implementation of these provisions can be carried out with the addition of small buffer memories used to store the validity bits BE1, BE2, BE4, and adding to each bus of the network only one transmission line per elementary flit making up each flit transmitted by the bus. Furthermore, the logic circuits generating or using the validity bits implement simple mechanisms and thus occupy very little space on a chip into which a system implementing these provisions is integrated.

It will be understood by those skilled in the art that various alternative embodiments and various applications of the present invention are possible. In particular, the invention is not limited to 32-bit elementary flits and width conversions between buses of widths corresponding to one, two or four elementary flits. The claims attached can be applied to other sizes of elementary flits and to any other bus widths that are multiples of a same bus width corresponding to the size of one elementary flit. Embodiments apply to systems on chip and may also apply to any system comprising a data transmission network made up of buses of different widths.

The various embodiments described above can be combined to provide further embodiments. These and other

The invention claimed is:

1. A method of transmitting a message in a data path of a network, the data path having buses of different widths, the method comprising:
   transmitting a message onto an input bus of an input interface module of the network;
   receiving the message with the interface module as a message divided into first flits, each first flit having a width corresponding to a width of the input bus;
   storing the message as one or more elementary flits, each elementary flit having a width equal or less than a smallest bus width of the network;
   setting a validity indicator for each elementary flit received by the input interface module to a valid state or an invalid state to indicate respectively whether a corresponding elementary flit is valid or invalid;
   transmitting the message onto an output bus of the interface module towards a receiving interface module, the transmitted message being divided into second flits, each second flit having a width corresponding to a width of the output bus of the input interface module;
   transmitting toward the receiving interface module, each validity indicator set in association with the corresponding elementary flit;
   receiving with the receiving interface module the second flits constituting the message;
   receiving with the receiving interface module each validity indicator associated with a corresponding elementary flit; and
   rejecting a received second flit if each elementary flit of the received second flit is associated with a validity indicator in the invalid state.

2. The method according to claim 1, comprising:
   applying a circular permutation to the elementary flits of a second flit of a message received by the receiving interface module according to a target address of the message received when a size of the message received is less than half of a width of an output bus of the receiving interface module.

3. The method according to claim 1 wherein validity indicators are set by the input interface module according to at least three criteria including a size of the message, the width of the input bus via which the message is received, and a target address of the message.

4. The method according to claim 1 wherein storing the message includes storing the elementary flits in a first buffer memory and setting the validity indicator includes storing the validity indicator in a second buffer memory.

5. The method according to claim 1 wherein the message has a size less than or equal to that of an elementary flit, and is received in a flit comprising several elementary flits, the target address of the message being used to determine the position of the elementary flit containing the message in the received flit, the validity indicators of the elementary flits of the received flit being determined according to this position.

6. The method according to claim 1 wherein the message has a size less than or equal to half a received flit that comprises at least two elementary flits, the target address of the message being used to determine a position of each elementary flit containing a portion of the message in the received flit, each validity indicator of each elementary flit of the received flit being determined according to the position of each elementary flit.

7. The method according to claim 1, comprising:
   receiving by a link module of the network located in the data path, second flits constituting the message and validity indicators associated with elementary flits of the second flits received;
   dividing the message received into third flits corresponding to a width of an output bus of the link module; and
   transmitting to the receiving interface module each third flit obtained in the division step if each elementary flit contained in the third flit is associated with a validity indicator in the valid state, each third flit transmitted by the link module being transmitted in association with the validity indicator of each elementary flit contained in the third flit.

8. The method according to claim 7, comprising:
   storing the received second flits in a first buffer memory in the link module; and
   storing the received validity indicators in a second buffer memory in the link module.

9. A system, comprising:
   at least one master module;
   a plurality of slave modules;
   at least one interface module;
   a network linking the at least one master module and at least one slave module via the at least one interface module, wherein a master module having a first bus width is configured to communicate with a slave module having a second bus width different from the first bus width, the at least one interface module having:
   an input bus having an input bus width;
   an output bus having an output bus width;
   an encoding module coupled to the input bus and configured to receive a message constituted as one or more first flits, each first flit having a width corresponding to a width of the input bus, the encoder further configured to divide the message into one or more elementary flits, each elementary flit having a width equal or less than a smallest bus width of the network;
   a data buffer memory arranged to store the one or more elementary flits;
   a validity bit buffer memory arranged to store validity indicators, each validity indicator arranged to be set to a valid state or an invalid state indicative respectively of whether or not a corresponding stored elementary flit is valid or invalid; and
   a decoder module configured to pass the message onto the output bus as one or more second flits, each second flit having a width corresponding to a the output bus width.

10. The system according to claim 9, wherein the input bus width of the at least one interface module is at least as wide as the first bus width.

11. The system according to claim 9, wherein second bus width is at least as wide as the output bus width of the at least one interface module.

12. The system according to claim 9, comprising:
    at least one link module located in the network, the at least one link module configured to:
    receive second flits constituting the message;
    receive validity indicators associated with elementary flits of the received second flits;
    divide the message received into link module flits corresponding to a width of an output bus of the link module; and transmit onto the output bus of the link module each link module flit if each elementary flit contained in said each link module flit is associated with a validity indicator in the valid state.

13. The system according to claim 12, wherein input bus width of the at least one interface module is at least as wide as the width of the output bus of the link module.

14. The system according to claim 12, comprising:
a first buffer memory in the at least one link module arranged to store the second flits received; and
a second buffer memory in the at least one link module arranged to store received validity indicators.

15. The system according to claim 9 wherein each internal bus of the network is associated with a transmission line configured to transmit validity indicators corresponding to each elementary flit.

16. The system according to claim 9 wherein the network comprises:
at least one routing module configured to route messages to a receiving module according to a target address of the message.

17. A network in a chip, comprising:
a plurality of interface modules, each interface module having:
an interface module input bus having an input bus width;
an encoder coupled to the interface module input bus;
a data buffer coupled to the encoder;
a validity bit buffer coupled to the encoder;
a reading module coupled to the data buffer and the validity bit buffer; and
an interface module output bus having an output bus width, the plurality of modules including a first interface module configured to:
receive a message on the input bus constituted as one or more input flits each having an input flit width;
divide the message with the encoder into one or more elementary flits having an elementary flit width equal or less than a smallest bus width of the network;
store the one or more elementary flits in the data buffer;
store a validity bit corresponding to each stored elementary flit in the validity bit buffer; and
pass the message on the output bus as one or more output flits each having the output bus width.

18. The network in a chip according to claim 17, comprising:
at least two internal bus data paths, at least one of the internal bus data paths chosen from the set of STBus, AMBA, AXI, AHB, APB, CoreConnect, and Wishbone.

19. The network in a chip according to claim 17 wherein the chip is a network on chip (NoC) or a system on chip (SoC).

20. The network in a chip according to claim 17, comprising:
a second interface module coupled to the first interface module wherein the input bus width of the first interface module is different from the output bus width of the second interface module.

* * * * *